United States Patent [19]
Tanizaki et al.

[11] Patent Number: 5,998,039
[45] Date of Patent: *Dec. 7, 1999

[54] POLYPROPYLENE COMPOSITION AND USES THEREOF

[75] Inventors: Tatsuya Tanizaki; Mikio Hashimoto, both of Waki-cho; Masahiro Sugi, Ichihara; Toshiyuki Tsutsui, Waki-cho; Yasuo Tanaka; Mamoru Kagami, both of Ichihara, all of Japan

[73] Assignee: Mitsui Chemicals, Inc., Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/890,360

[22] Filed: Jul. 9, 1997

Related U.S. Application Data

[63] Continuation of application No. 08/568,239, Dec. 6, 1995, abandoned.

[30] Foreign Application Priority Data

| Dec. 6, 1994 | [JP] | Japan | 6-302539 |
| Mar. 3, 1995 | [JP] | Japan | 7-044440 |
| Mar. 7, 1995 | [JP] | Japan | 7-047471 |

[51] Int. Cl.$^6$ ............... B32B 27/32; C08L 23/14
[52] U.S. Cl. ............ 428/516; 428/515; 428/34.9; 428/910; 525/240; 526/348.1; 526/348.6
[58] Field of Search ............ 525/240; 428/910, 428/515, 516, 34.9; 526/348.1, 348.6, 348

[56] References Cited

U.S. PATENT DOCUMENTS

| 4,211,852 | 7/1980 | Matsuda et al. | 525/240 |
| 5,331,054 | 7/1994 | Fujita et al. | 525/240 |
| 5,336,746 | 8/1994 | Tsutsui et al. | 526/348.6 |
| 5,677,408 | 10/1997 | Ueda et al. | 526/8 |

FOREIGN PATENT DOCUMENTS

| 0412416 | 2/1991 | European Pat. Off. |
| 0560326 | 9/1993 | European Pat. Off. |
| 06263935 | 9/1994 | Japan . |
| 2040964 | 9/1980 | United Kingdom . |

OTHER PUBLICATIONS

Database WPI, Derwent Publications Ltd., London, GB; AN 94–338421 & JP–A–06 263 935 (Mitsui Petrochem), Sep. 20, 1994 (Eng. Abstract).

*Primary Examiner*—Stevan A. Resan
*Assistant Examiner*—D. Lawrence Tarazano

[57] ABSTRACT

Disclosed is a polypropylene composition comprising (A) polypropylene and (B) a specific propylene-1-butene random copolymer in a specific amount ratio. The propylene-1-butene random copolymer (B) is characterized in that: (1) the copolymer contains 50 to 95% by mol of constituent units from propylene and 50 to 5% by mol of constituent units from 1-butene, (2) the intrinsic viscosity, as measured in decahydronaphthalene at 135° C., is in the range of 0.1 to 12 dl/g, (3) the molecular weight distribution (Mw/Mn), as determined measured by GPC, is not more than 3, and (4) the parameter B value indicating randomness of the copolymerized monomer sequence distribution is in the range of 1.0 to 1.5. Also disclosed is a polypropylene composite film comprising (I) a crystalline polypropylene layer and (II) a layer formed from the polypropylene composition, which is laminated on at least one surface of the crystalline polypropylene layer (I). The polypropylene composition is excellent in heat resistance and low-temperature heat-sealing properties as well as in flexibility and impact resistance. The polypropylene composite film is excellent in not only heat-sealing properties, particularly low-temperature heat-sealing properties, but also transparency, scratch resistance and blocking resistance.

23 Claims, No Drawings

POLYPROPYLENE COMPOSITION AND USES THEREOF

This application is a continuation, of application Ser. No. 08/568,239, filed Dec. 6, 1995, now abandoned.

FIELD OF THE INVENTION

The present invention relates to a polypropylene composition excellent in heat resistance and low-temperature heat-sealing properties as well as in flexibility and impact resistance, and also relates to uses of the polypropylene composition.

BACKGROUND OF THE INVENTION

Polypropylene has been heretofore widely used as a thermoplastic molding material having high rigidity, heat resistance and transparency. However, the polypropylene is poor in flexibility and impact resistance, so that in order to improve these properties, a soft rubber component have generally been added to the polypropylene.

However, the addition of a soft rubber component to the polypropylene to obtain polypropylene compositions improved in the flexibility and impact resistance causes a problem that the heat resistance of the propylene is deteriorated. Such polypropylene compositions are also desired to be improved in low-temperature heat-sealing properties.

Accordingly, the advent of propylene compositions excellent in heat resistance and low-temperature heat-sealing properties as well as in flexibility and impact resistance has been desired.

Crystalline polypropylene films are widely employed particularly in the field of food packaging because of their excellent mechanical properties such as tensile strength, rigidity, surface hardness, impact resistance and cold temperature resistance, optical properties such as glossiness and transparency, and food hygienic properties such as nontoxicity and odorless properties. The crystalline polypropylene films shrink when heated to their heat-sealing temperature, and hence it is difficult to heat-seal the films having a single layer structure. Therefore, the crystalline polypropylene films are usually provided with a heat-sealing layer, which is generally formed from a polymer such as a low-density polyethylene or a propylene-ethylene random copolymer.

The polymer for forming the heat-sealing layer is required to have, for example, the following properties:

(1) The polymer can be heat-sealed at a temperature considerably lower than the substrate (crystalline polypropylene film);
(2) The polymer is excellent in heat-sealing strength and has no change of the heat-sealing strength with time;
(3) The polymer is excellent in bond strength to the substrate;
(4) The polymer has transparency almost equal to or higher than that of the substrate;
(5) The polymer can be stored without blocking;
(6) The polymer does not adhere to bag making machines or fill-packaging machines; and
(7) The polymer has high scratch resistance.

However, the conventional heat-sealing materials do not always satisfy all of these properties. For example, though the low-density polyethylene can be heat-sealed at a low temperature, it is poor in the heat-sealing strength and bond property to the substrate and easily adheres to the packaging machines or the like.

The propylene-ethylene random copolymer satisfies the above properties (2) to (7), but does not satisfy the property (1). For example, a polypropylene composite film having a heat-sealing layer of the propylene-ethylene random copolymer has a harrow heat-sealing temperature range. Therefore, when the composite film is heat-sealed by means of an automatic packaging machine or an automatic bag making machine, the heat-sealing temperature must be strictly controlled. It has been proposed to use a blend of the propylene-ethylene random copolymer and an ethylene-α-olefin copolymer as a heat-sealing material. However, this blend is poor in the transparency, though it is more improved in the low-temperature heat-sealing properties as compared with the propylene-ethylene random copolymer.

The present inventors have found that a propylene-1-butene random copolymer having a propylene content of 55 to 85% by weight and a heat quantity of crystal fusion (measured by a differential scanning calorimeter) of 20 to 80 J/g has high transparency and good low-temperature heat-sealing properties and thus is useful as a heat-sealing material. Based on these findings, the present inventors have proposed to use, as a heat-sealing layer for a polypropylene film, a composition which comprises the propylene-1-butene random copolymer and an isotactic polypropylene (Japanese Patent Laid-Open Publication No. 114887/1979). The heat-sealing layer formed from this composition is excellent in the low-temperature heat-sealing properties and blocking resistance, but it is a little inferior in the blocking resistance and scratch resistance to the heat-sealing layer formed from the propylene-ethylene random copolymer.

The present inventors have also proposed, as a composite film of high heat-sealing properties, a composite film consisting of an isotactic polypropylene film and a heat-sealing layer formed from a composition which comprises 10 to 40% by weight of a propylene-1-butene copolymer and a crystalline propylene-α-olefin random copolymer (Japanese Patent Publication No. 42626/1986).

The polypropylene films described above are desired to have further properties such that the films are applicable to high-speed packaging. Thus, the films are desired to have, for example, not only improved low-temperature heat-sealing properties and hot tack properties but also improved slip properties and blocking resistance.

Under such circumstances as mentioned above, the present inventors have studied polypropylene compositions comprising polypropylene and a rubber component, and have found that use of polypropylene and a specific propylene-1-butene random copolymer makes it possible to prepare a polypropylene composition excellent in heat resistance and low-temperature heat-sealing properties as well as in flexibility and impact resistance. The present inventors have also found that a polypropylene film having a heat-sealing layer made of the above-mentioned polypropylene composition has desired properties for applying to the high-speed packaging, such as not only excellent low-temperature heat-sealing properties and hot tack properties but also excellent slip properties and blocking resistance. Moreover, the present inventors have found that the specific propylene-1-butene random copolymer can be prepared using a specific metallocene compound catalyst component. Based on these findings, the present invention has been accomplished.

OBJECT OF THE INVENTION

It is an object of the present invention to provide a polypropylene composition which is excellent in heat resistance and low-temperature heat-sealing properties as well as in flexibility and impact resistance.

It is another object of the invention to provide a polypropylene composite film which includes a layer formed from the polypropylene composition and is excellent in not only transparency, low-temperature heat-sealing properties and hot tack properties but also blocking resistance and mechanical properties as scratch resistance.

SUMMARY OF THE INVENTION

According to the present invention, there is provided a polypropylene composition comprising:

(A) polypropylene in an amount of 5 to 95% by weight, and (B) a propylene-1-butene random copolymer in an amount of 95 to 5% by weight, based on the weight of the polypropylene and the propylene-1-butene random copolymer;

said propylene-1-butene random copolymer (B) having the following properties:

(1) the copolymer contains 50 to 95% by mol of constituent units from propylene and 50 to 5% by mol of constituent units from 1-butene based on the amount of propylene and 1-butene units in the copolymer, or based on the total amount of monomer units in the copolymer, if other monomer units are present;

(2) the intrinsic viscosity, as measured in decahydronaphthalene at 135° C., is in the range of 0.1 to 12 dl/g;

(3) the molecular weight distribution (Mw/Mn), as determined by gel permeation chromatography (GPC), is not more than 3; and (4) the parameter B value indicating randomness of the copolymerized monomer sequence distribution is in the range of 1.0 to 1.5, preferably 1.0 to 1.3.

As the polypropylene (A), preferably used is a random copolymer of propylene and an olefin other than propylene, which contains not more than 10% by mol of units from the olefin.

In addition to the properties (1) to (4), the propylene-1-butene random copolymer (B) preferably further has the following properties (5) and (6):

(5) the melting point Tm, as measured by a differential scanning calorimeter, is in the range of 60 to 140° C., and the melting point Tm and the 1-butene constituent unit content M (% by mol) satisfy the following relation:

$-2.6M+130 \leq Tm \leq -2.3M+155$; and (6) the crystallinity C, as measured by X-ray diffractometry, and the 1-butene constituent unit content M (% by mol) satisfy the following relation:

$C \geq -1.5M+75$.

The propylene-1-butene random copolymer (B) used in the invention can be prepared using an olefin polymerization catalyst comprising:

(a) a transition metal compound represented by the following formula (1):

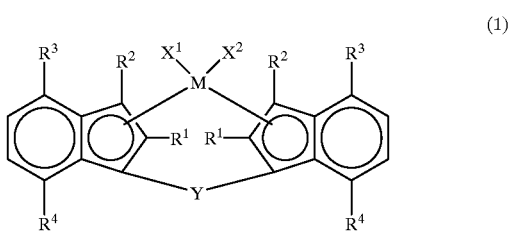

wherein M is a transition metal of Group IVa, Va or VIa of the periodic table, $R^1$ and $R^2$ are each a hydrogen atom, a halogen atom, a hydrocarbon group of 1 to 20 carbon atoms, a halogenated hydrocarbon group of 1 to 20 carbon atoms, a silicon-containing group, an oxygen-containing group, a sulfur-containing group, a nitrogen-containing group or a phosphorus-containing group, $R^3$ is a hydrocarbon group of 1 to 20 carbon atoms which may be substituted with a halogen atom or a silicon-containing group, $R^4$ is a hydrogen atom or an alkyl group of 1 to 20 carbon atoms, $X^1$ and $X^2$ are each a hydrogen atom, a halogen atom, a hydrocarbon group of 1 to 20 carbon atoms, a halogenated hydrocarbon group of 1 to 20 carbon atoms, an oxygen-containing group or a sulfur-containing group, and Y is a divalent hydrocarbon group of 1 to 20 carbon atoms, a divalent halogenated hydrocarbon group of 1 to 20 carbon atoms, a divalent silicon-containing group, a divalent germanium-containing group, a divalent tin-containing group, —O—, —CO—, —S—, —SO—, —SO$_2$—, —NR$^5$—, —P(R$^5$)—, —P(O)(R$^5$)—, —BR$^5$— or —AlR$^5$— (R$^5$ is a hydrogen atom, a halogen atom, a hydrocarbon group of 1 to 20 carbon atoms or a halogenated hydrocarbon group of 1 to 20 carbon atoms);

(b) (b-1) an organoaluminum oxy-compound, and/or (b-2) a compound capable of reacting with the transition metal compound (a) to form an ion pair; and, optionally, (c) an organoaluminum compound.

In the present invention, it is preferred to use a transition metal compound (a) of the above formula wherein $R^1$ is methyl, and also a hydrocarbon group of 2 to 6 carbon atoms.

The present invention further provides a polypropylene composite film comprising:

(I) a crystalline polypropylene layer, and (II) a layer formed from the polypropylene composition of the present invention, which is laminated on at least one surface of the crystalline polypropylene layer (I).

In the present invention, the polypropylene composition layer (II) is preferably formed from a polypropylene composition comprising:

the polypropylene (A) in an amount of 5 to 50% by weight, and the propylene-1-butene random copolymer (B) in an amount of 95 to 50% by weight; or the polypropylene (A) in an amount of not less than 50% by weight and less than 90% by weight, and the propylene-1-butene random copolymer (B) in an amount of not less than 10% by weight and less than 50% by weight.

The polypropylene (A) is preferably a crystalline polypropylene containing units from propylene in an amount of not less than 90% by mol.

The intrinsic viscosity (2) of the propylene-1-butene random copolymer (B) is preferably in the range of 0.1 to 5 dl/g.

The crystalline polypropylene layer [I] may be either unstretched or biaxially stretched.

DETAILED DESCRIPTION OF THE INVENTION

The polypropylene composition of the invention will be described in detail hereinafter.

The polypropylene composition of the invention comprises the following polypropylene and the specific propylene-1-butene random copolymer as described below.

(A) Polypropylene

In the present invention, any conventionally known polypropylene may be used as the polypropylene (A). The polypropylene may be either a homopolypropylene or a propylene random copolymer containing propylene units and small amounts (e.g., not more than 10% by mol, preferably less than 5% by mol) of units from an olefin other than propylene. Of these, the propylene random copolymer is preferably used.

When the polypropylene composition of the invention is intended to be used for a composite film, which will be described later, the polypropylene (A) is preferably a crystalline polypropylene containing units from propylene in amounts of not less than 90% by mol.

Examples of the other olefins for the propylene random copolymer include α-olefins of 2 to 20 carbon atoms except propylene, such as ethylene, 1-butene, 1-pentene, 1-hexene, 1-heptene, 1-octene, 1-decene, 1-dodecene, 1-hexadecene and 4-methyl-1-pentene.

In the present invention, it is preferred to employ as the polypropylene (A) a polypropylene prepared by a conventional process using a known solid titanium catalyst component. Also employable is a polypropylene prepared using a metallocene compound catalyst component.

The polypropylene used in the invention has a melting point (Tm) of 100 to 165° C., preferably 120 to 165° C. Of the polypropylenes having such melting points, desirably used is a polypropylene having a melting point higher than that of the later-described propylene-1-butene random copolymer.

The polypropylene has a melt flow rate MFR (ASTM D-1238, 230° C., load of 2.16 kg) of polypropylene in the range of usually 0.1 to 400 g/10 min, preferably 1 to 100 g/10 min, and a molecular weight distribution (Mw/Mn) of more than 3, preferably 4 to 15.

The polypropylene (A) is generally more rigid than the below-described propylene-1-butene random copolymer (B).

(B) Propylene-1-butene Random Copolymer

The polypropylene composition of the invention comprises the specific propylene-1-butene random copolymer (B) as described below. This propylene-1-butene random copolymer is preferably in an elastomeric state.

(1) The propylene-1-butene random copolymer used in the invention is a random copolymer of propylene and 1-butene, and contains:

constituent units from propylene in amounts of 50 to 95% by mol, preferably 60 to 93% by mol, more preferably 70 to 90% by mol, e.g. 70 to 87% by mol, and constituent units from 1-butene in amounts of 50 to 5% by mol, preferably 40 to 7% by mol, more preferably 30 to 10% by mol e.g. 30 to 13% by mol.

This propylene-1-butene random copolymer may further contain constituent units from olefins other than propylene and 1-butene, e.g., ethylene, in a small amount, e.g., not more than 10% by mol.

(2) Intrinsic Viscosity (η)

The intrinsic viscosity (η) of the propylene-1-butene random copolymer used in the invention, as measured in decahydronaphthalene at 135° C., is in the range of 0.1 to 12 dl/g, preferably 0.5 to 12 dl/g, more preferably 1 to 12 dl/g.

(3) Molecular Weight Distribution

The molecular weight distribution (Mw/Mn) of the propylene-1-butene random copolymer used in the invention, as determined by gel permeation chromatography (GPC), is not more than 3, preferably 1.8 to 3.0, more preferably 1.9 to 2.5.

(4) Randomness

The parameter B value of the propylene-1-butene random copolymer used in the invention, which indicates randomness of the copolymerized monomer sequence distribution, is in the range of 1.0 to 1.5, preferably 1.0 to 1.3, more preferably 1.0 to 1.2.

The parameter B value was proposed by B. D. Cole-man and T. G. Fox in J. Polym. Sci., Al, 3188 (1963), and this parameter can be obtained from the following formula:

$$B = P_{12}/(2P_1 \cdot P_2)$$

wherein $P_1$ is a first monomer content fraction, $P_2$ is a second monomer content fraction, and $P_{12}$ is a proportion of the first monomer-second monomer sequences to the total diad sequences.

In the case of B=1, Bernoulli's statistics apply to the copolymer; in the case of B<1, the copolymer tends to be block; in the case of B>1, the copolymer tends to be alternating; and in the case of B=2, the copolymer is an alternating copolymer.

It is preferred that the propylene-1-butene random copolymer (B) used in the invention has, in addition thereto, the above properties (1) to (4) and the following properties (5) and (6).

(5) Melting Point Tm

The melting point Tm of the propylene-1-butene random copolymer (B) used in the invention, as measured by a differential scanning calorimeter, is in the range of 60 to 140° C., preferably 80 to 130° C.

It is desired that in the propylene-1-butene random copolymer (B), the melting point Tm and the 1-butene constituent unit content M (% by mol) satisfy the following relation:

$$-2.6M + 130 \leq Tm \leq -2.3M + 155$$

(6) It is also desired that in the propylene-1-butene random copolymer (B), the crystallinity C measured by X-ray diffractometry and the 1-butene constituent unit content M (% by mol) satisfy the following relation:

$$C \geq -1.5M + 75$$

The propylene-1-butene random copolymer (B) used in the invention may further have the following property (7).

(7) Stereoregularity of the Propylene-1-butene Random Copolymer (triad tacticity, mm fraction)

The stereoregularity of the propylene-1-butene random copolymer used in the invention can be evaluated by triad tacticity (mm fraction).

When head-to-tail enchained three propylene unit sequences in the polymer chains are expressed by a surface zigzag structure, the mm fraction is defined as a proportion of the propylene unit sequences having the same branch directions of the methyl groups and can be determined in the following manner using a $^{13}$C-NMR spectrum.

For determining the mm fraction of the propylene-1-butene random copolymer from the $^{13}$C-NMR spectrum, the mm fractions of (i) head-to-tail enchained propylene unit triad sequences and (ii) propylene unit-butene unit triad sequences consisting of propylene units of head-to-tail enchained propylene units and butene units and containing propylene units as the second units
are measured as the mm fraction of the propylene unit-containing triad sequences present in the polymer chains.

The mm fractions can be determined from the peak intensities of the side chain methyl groups of the second units (propylene units) in the triad sequences (i) and (ii), as described below in detail.

The $^{13}$C-NMR spectrum of the propylene-1-butene random copolymer is measured for a sample of the random copolymer which is completely dissolved in hexachlorobutadiene containing a small amount of deuterated benzene as a lock solvent by a proton complete decoupling method at 120° C. under the measuring conditions of a flip angle of 450° and a pulse interval of not shorter than 3.4 $T_1$ ($T_1$: longest time among the spin-lattice relaxation time of methyl groups). Since $T_1$ of a methylene group and $T_1$ of a methine group are shorter than that of a methyl group, the magnetization recovery of all the carbon atoms in the sample is not less than 99% under the above conditions. As for the chemical shift, the methyl carbon peak of the third unit in the head-to-tail enchained propylene unit pentad sequence (mmmm) is set to 21.593 ppm on the basis of tetramethylsilane, and other carbon peaks are determined based on this peak.

In the $^{13}$C-NMR spectrum of the propylene-1-butene random copolymer thus measured, the methyl carbon region wherein the side chain methyl groups of the propylene units are observed (about 19.5 to 21.9 ppm) is classified into:

a first peak region (about 21.0 to 21.9 ppm), a second peak region (about 20.2 to 21.0 ppm), and a third peak region (about 19.5 to 20.2 ppm).

In each of the above regions, peaks of the side chain methyl groups of the second units (propylene units) in the head-to-tail enchained triad sequences (i) and (ii) are observed as shown in Table 1.

TABLE 1

| | Methyl carbon region (19.5~21.9 ppm) | | |
|---|---|---|---|
| Shift value | First region 21.0~21.9 ppm | Second region 20.2~21.0 ppm | Third region 19.5~20.2 ppm |
| Hand-to-tail enchainment | | | |
| Sequence (i) | PPP (mm) | PPP (mr) | PPP (rr) |
| Sequence (ii) | PPB (mm) | PPB (mr) | |
| | BPB (mm) | BPB (mr) | |
| | | PPB (rr) | |
| | | BPB (rr) | |

In the above table, P indicates a constituent unit from propylene, and B indicates a constituent unit from 1-butene.

With regard to the triad sequences (i) consisting of only propylene units, i.e., PPP (mm), PPP (mr) and PPP (rr), among the head-to-tail enchained triad sequences (i) and (ii) shown in Table 1, the directions of the methyl groups are illustrated below by the surface zigzag structures. These PPP sequences apply correspondingly to the mm, mr and rr triad sequences (PPB, BPB) (ii) which contain butene unit.

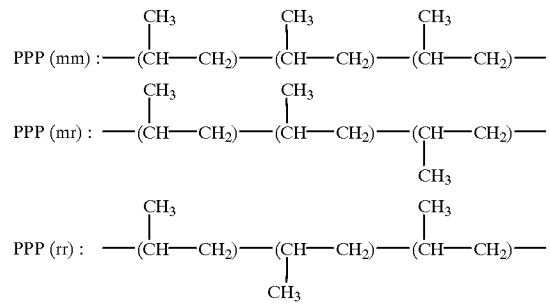

In the first region, the methyl groups of the second units (propylene units) in the mm triad sequences PPP, PPB and BPB resonate.

In the second region, the methyl groups of the second units (propylene units) in the mr triad sequences PPP, PPB and BPB and the methyl groups of the second units (propylene units) in the rr triad sequences PPB and BPB resonate.

In the third region, the methyl groups of the second units (propylene units) in the rr triad sequences PPP resonate.

Accordingly, when (i) the head-to-tail enchained propylene unit triad sequences and (ii) the propylene unit-butene unit triad sequences consisting of head-to-tail enchained propylene units and butene units and containing propylene units as the second units are measured on the side chain methyl groups of the propylene units of the second units in the triad sequences using the $^{13}$C-NMR spectrum (hexachlorobutadiene solution, tetramethylsilane standard), the triad tacticity (mm fraction) of the propylene-1-butene random copolymer can be determined as a proportion (percentage) of the area of the peaks appeared in the region of 21.0 to 21.9 ppm (the first region) based on the total area of the peaks appeared in the region of 19.5 to 21.9 ppm (methyl carbon region) being 100%, in accordance with the following equation.

$$\text{mm Fraction (\%)} = \frac{\text{Methyl group intensity } (PPP(mm) + PPB(mm) + BPB(mm))}{\begin{array}{c}\text{Methyl group intensity } (PPP(mm) + PPB(mm) + BPB(mm) + \\ PPP(mr) + PPB(mr) + BPB(mr) + \\ PPP(rr) + PPB(rr) + BPB(rr))\end{array}}$$

In the propylene-1-butene random copolymer used in the invention, the mm fraction determined as above is preferably not less than 90%, more preferably not less than 92%, most preferably not less than 94%.

Other than the above-mentioned head-to-tail enchained triad sequences (i) and (ii), the propylene-1-butene random copolymer has small amounts of partial structures which contain regio-irregular units represented by the following structures (iii), (iv) and (v), and the peaks derived from the side chain methyl groups of the propylene units having such structures (iii), (iv) and (v) are observed in the above-mentioned methyl carbon region (19.5 to 21.9 ppm).

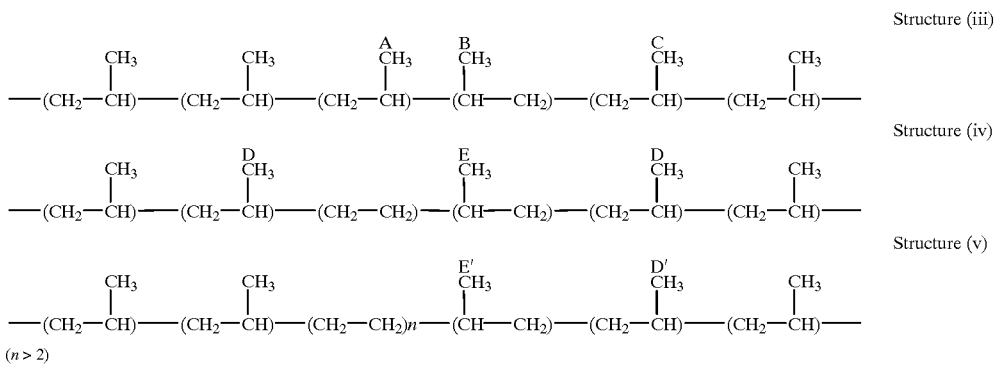

Of the methyl groups from the above structures (iii), (iv) and (v), the methyl carbon A and the methyl carbon B resonate at 17.3 ppm and 17.0 ppm, respectively, and consequently the peaks based on the carbon A and the carbon B do not appear in the first to third regions (19.5 to 21.9 ppm). Further, the carbon A and the carbon B have no relation to the head-to-tail enchained propylene triad sequence, so that they do not need to be taken into account in the calculation of the triad tacticity (mm fraction).

The peak based on the methyl carbon C, the peak based on the methyl carbon D and the peak based on the methyl carbon D' appear in the second region, and the peak based on the methyl carbon E and the peak based on the methyl carbon E' appear in the third region.

In the first to third methyl carbon regions, therefore, there appear a peak based on the PPE-methyl group (side chain methyl group in the propylene-propylene-ethylene sequence) (20.7 ppm or thereabout), a peak based on the EPE-methyl group (side chain methyl group in the ethylene-propylene-ethylene sequence) (19.8 ppm or thereabout) and peaks based on the methyl group C, the methyl group D, the methyl group D', the methyl group E and the methyl group E'.

As described above, the peaks based on the methyl groups other than those of the head-to-tail triad sequences (i) and (ii) are observed, and in the determination of the mm fraction using the above equation, correction is made in the following manner.

The peak area based on the PPE-methyl group can be determined from the peak area of the PPE-methine group (resonance at 30.6 ppm or thereabout), and the peak area based on the EPE-methyl group can be determined from the peak area of the EPE-methine group (resonance at 32.9 ppm or thereabout).

The peak area based on the methyl group C can be determined from the peak area of the adjacent methine group (resonance at 31.3 ppm or thereabout).

The peak area based on the methyl group D can be determined from ½ of the total peak area of the peaks based on the αβ methylene carbon in the above structure (iv) (resonance at 34.3 ppm or thereabout and resonance at 34.5 ppm or thereabout), and the peak area based on the methyl group D' can be determined from the area of the peak based on the adjacent methine group (resonance at 33.3 ppm or thereabout) of the methyl group E' in the above structure (v).

The peak area based on the methyl group E can be determined from the peak area of the adjacent methine carbon (resonance at 33.7 ppm or thereabout), and the peak area of the methyl group E' can be determined from the peak area of the adjacent methine carbon (resonance at 33.3 ppm or thereabout).

Accordingly, the peak area of the methyl groups based on the head-to-tail enchained propylene unit triad sequences (i) and (ii) can be determined by subtracting the peak area of the above methyl groups from the total peak area of the peaks in the second and third regions.

Thus, the peak area of the methyl groups based on the head-to-tail enchained propylene unit triad sequences (i) and (ii) can be evaluated, and consequently the mm fraction can be calculated in accordance with the above equation.

The carbon peaks in the spectrum can be assigned with reference to a literature "Polymer", 30, 1350 (1989).

(8) Hetero Bond Unit

The propylene-1-butene random copolymer (B) used in the invention sometimes has small amounts of structures which contain hetero bond units (regio-irregular units) based on 2,1-insertions or 1,3-insertions of propylene present in the propylene sequences.

In the polymerization, propylene is generally 1,2-inserted (methylene side is bonded to catalyst) to form the aforesaid head-to-tail enchained propylene sequence, but in rare cases propylene is 2,1-inserted or 1,3-inserted. The 2,1-inserted propylenes or the 1,3-inserted propylenes form regio-irregular units represented by the aforementioned structures (iii), (iv) and (v) in the polymer. The proportions of the 2,1-insertions and the 1,3-insertions of propylene in the polymer constituent units can be determined from the following equation using a $^{13}$C-NMR spectrum with reference to "Polymer", 30, 1350 (1989), similarly to the aforesaid triad tacticity.

The proportion of the regio-irregular units based on the 2,1-insertions of propylene can be determined from the following equation.

$$\text{Proportion of regio-irregular units based on 2,1-insertions} = \frac{\{0.5 I\alpha\beta(\text{Structure }(iii), (v)) + 0.25 I\alpha\beta(\text{Structure}(iv))\}}{I\alpha\alpha + I\alpha\beta(\text{Structure}(iii), (v)) + 0.5(I\alpha\gamma + I\alpha\beta(\text{Structure}(iv)) + I\alpha\delta)} \times 100$$

When it is difficult to directly determine the area of Iαβ or the like from the spectrum because of, for example, overlapping of the peaks, correction can be made using the carbon peaks having corresponding areas.

In the propylene-1-butene random copolymer (B) used in the invention, the hetero bond units based on the 2,1-insertions of propylene present in the propylene sequences may be contained in an amount of not less than 0.01%, specifically 0.01 to 0.3%, based on all the propylene units.

The regio-irregular units based on the 1,3-insertions of propylene may be contained in the propylene-1-butene random copolymer (B) in an amount of not more than 0.05%, and this proportion of the regio-irregular units based on the 1,3-insertions of propylene can be determined from the βγ peak (resonance at 27.4 ppm or thereabout).

Such a propylene-1-butene random copolymer as mentioned above, which is used in the invention, contains a tacky ingredient in a smaller amount than the rubbers conventionally known.

The propylene-1-butene random copolymer (B) used in the invention can be prepared by copolymerizing propylene and 1-butene in the presence of an olefin polymerization catalyst comprising:

(a) a transition metal compound described later;
(b) (b-1) an organoaluminum oxy-compound, and/or
    (b-2) a compound capable of reacting with the transition metal compound (a) to form an ion pair;
and, optionally,
(c) an organoaluminum compound.

Next, the olefin polymerization catalyst used for preparing the propylene-1-butene random copolymer (B) in the invention is described in detail.

The transition metal compound (a) (hereinafter sometimes referred to as "component (a)") for forming the olefin polymerization catalyst used for the invention is represented by the following formula (1):

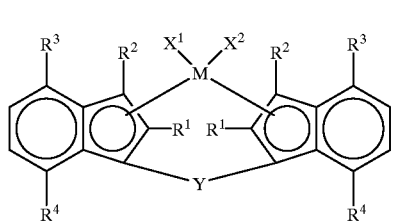

(1)

wherein M is a transition metal of Group IVa, Group Va or Group VIa of the periodic table. Examples thereof include titanium, zirconium, hafnium, vanadium, niobium, tantalum, chromium, molybdenum and tungsten. Of these, preferred are titanium, zirconium and hafnium. Particularly preferred is zirconium.

Substituents $R^1$ and $R^2$ $R^1$ and $R^2$ are each independently a hydrogen atom, a halogen atom, a hydrocarbon group of 1 to 20 carbon atoms, a halogenated hydrocarbon group of 1 to 20 carbon atoms, a silicon-containing group, an oxygen-containing group, a sulfur-containing group, a nitrogen-containing group or a phosphorus-containing group.

Examples of the halogens include fluorine, chlorine, bromine and iodine.

Examples of the hydrocarbon groups of 1 to 20 carbon atoms include alkyl groups, such as methyl, ethyl, propyl, butyl, hexyl, cyclohexyl, octyl, nonyl, dodecyl, eicosyl, norbornyl and adamantyl; alkenyl groups, such as vinyl, propenyl and cyclohexenyl; arylalkyl groups, such as benzyl, phenylethyl and phenylpropyl; and aryl groups, such as phenyl, tolyl, dimethylphenyl, trimethylphenyl, ethylphenyl, propylphenyl, biphenyl, naphthyl, methylnaphthyl, anthracenyl and phenanthryl.

Examples of the halogenated hydrocarbon groups include those obtained by substituting the above-mentioned hydrocarbon groups with halogen atoms.

Examples of the silicon-containing groups include monohydrocarbon-substituted silyls, such as methylsilyl and phenylsilyl; dihydrocarbon-substituted silyls, such as dimethylsilyl and diphenylsilyl; trihydrocarbon-substituted silyls, such as trimethylsilyl, triethylsilyl, tripropylsilyl, tricyclohexylsilyl, triphenylsilyl, dimethylphenylsilyl, methyldiphenylsilyl, tritolylsilyl and trinaphthylsilyl; silyl ethers of hydrocarbon-substituted silyls, such as trimethylsilyl ether; silicon-substituted alkyl groups, such as trimethylsilylmethyl; and silicon-substituted aryl groups, such as trimethylsilylphenyl.

Examples of the oxygen-containing groups include hydroxyl groups; alkoxy groups, such as methoxy, ethoxy, propoxy and butoxy; aryloxy groups, such as phenoxy, methylphenoxy, dimethylphenoxy and naphthoxy; and arylalkoxy groups, such as phenylmethoxy and phenylethoxy.

Examples of the sulfur-containing groups include those wherein oxygen is replaced with sulfur in the above-exemplified oxygen-containing groups.

Examples of the nitrogen-containing groups include amino groups; alkylamino groups, such as methylamino, dimethylamino, diethylamino, dipropylamino, dibutylamino and dicyclohexylamino; and arylamino groups and alkylarylamino groups, such as phenylamino, diphenylamino, ditolylamino, dinaphthylamino and methylphenylamino.

Examples of the phosphorus-containing groups include phosphino groups, such as dimethylphosphino and diphenylphosphino.

Of these, $R^1$ is preferably hydrogen, methyl, a hydrocarbon group of 2 to 6 carbon atoms and an aromatic group, and particularly preferably methyl and a hydrocarbon group of 2 to 6 carbon atoms.

$R^2$ is preferably hydrogen and a hydrocarbon group, and particularly preferably hydrogen.

Substituent $R^3$ $R^3$ is a hydrocarbon group of 1 to 20 carbon atoms which may be substituted with a halogen atom or a silicon-containing group, and is preferably a secondary or tertiary alkyl group of 3 to 20 carbon atoms or an aromatic group.

Examples of the secondary or tertiary alkyl groups include i-propyl, i-butyl, sec-butyl, tert-butyl, 1,2-dimethylpropyl, 2,3-dimethylbutyl, iso-pentyl, tert-pentyl, neopentyl, cyclopentyl, cyclohexyl, 4-methylcyclohexyl, iso-hexyl, norbornyl and adamantyl.

Examples of the aromatic groups include aryl groups, such as phenyl, tolyl, dimethylphenylyl, trimethylphenyl, ethylphenyl, propylphenyl, biphenyl, α- or β-naphthyl, methylnaphthyl, anthracenyl, phenanthryl, benzylphenyl, pyrenyl, acenaphthyl, phenalenyl, aceanthrylenyl, tetrahydronaphthyl, indanyl and biphenylyl; and arylalkyl groups, such as benzyl, phenylethylyl, phenylpropyl and tolylmethyl. These groups may contain double or triple bonds.

Further, these groups may be substituted with halogen atoms and silicon-containing groups as described for $R^1$.

Substituent $R^4$ $R^4$ is a hydrogen atom or an alkyl group of 1 to 20 carbon atoms.

Examples of the alkyl groups include chain and cyclic alkyl groups, such as methyl, ethyl, n-propyl, i-propyl, n-butyl, i-butyl, sec-butyl, tert-butyl, pentyl, hexyl, cyclohexyl, heptyl, octyl, nonyl, dodecyl, eicosyl, norbornyl and adamantyl.

These groups may be substituted with halogen atoms and silicon-containing groups as described for $R^1$.

$X^1$ and $X^2$ $X^1$ and $X^2$ are each a hydrogen atom, a halogen atom, a hydrocarbon group of 1 to 20 carbon atoms, a halogenated hydrocarbon group of 1 to 20 carbon atoms, an oxygen-containing group or a sulfur-containing group.

Examples of the halogen atoms, the oxygen-containing groups, the hydrocarbon groups of 1 to 20 carbon atoms and the halogenated hydrocarbon groups of 1 to 20 carbon atoms are those described for $R^1$.

Examples of the sulfur-containing groups include those described for $R^1$; and further sulfonato groups, such as methylsulfonato, trifluoromethanesulfonato, phenylsulfonato, benzylsulfonato, p-toluenesulfonato, trimethylbenzenesulfonato, triisobutylbenzenesulfonato, p-chlorobenzenesulfonato and pentafluorobenzenesulfonato; and sulfinato groups, such as methylsulfinato, phenylsulfinato, benzenesulfinato, p-toluenesulfinato, trimethylbenzenesulfinato and pentafluorobenzenesulfinato.

Y

Y is a divalent hydrocarbon group of 1 to 20 carbon atoms, a divalent halogenated hydrocarbon group of 1 to 20 carbon atoms, a divalent silicon-containing group, a divalent germanium-containing group, a divalent tin-containing group, —O—, —CO—, —S—, SO—, —SO$_2$—, —NR$^5$—, —P(R$^5$)—, —P(O)(R$^5$)—, —BR$^5$— or —AlR$^5$— (R$^5$ is a hydrogen atom, a halogen atom, a hydrocarbon group of 1 to 20 carbon atoms or a halogenated hydrocarbon group of 1 to 20 carbon atoms).

More specifically, there can be exemplified:

The divalent hydrocarbon groups of 1 to 20 carbon atoms include alkylene groups, such as methylene, dimethylmethylene, 1,2-ethylene, dimethyl-1,2-ethylene, 1,3-trimethylene, 1,4-tetramethylene, 1,2-cyclohexylene and 1,4-cyclohexylene, and arylalkylene groups, such as diphenylmethylene and diphenyl-1,2-ethylene.

The divalent halogenated hydrocarbon groups of 1 to 20 carbon atoms include the above-exemplified divalent hydrocarbon groups, which are halogenated, such as chloromethylene;

The divalent silicon-containing groups include alkylsilylene, alkylarylsilylene and arylsilylene groups, such as methylsilylene, dimethylsilylene, diethylsilylene, di(n-propyl)silylene, di(i-propyl)silylene, di(cyclohexyl)silylene, methylphenylsilylene, diphenylsilylene, di(p-tolyl)silylene and di(p-chlorophenyl)silylene, and alkyldisilylene, alkylaryldisilylene and aryldisilylene groups, scuh as tetramethyl-1,2-disilylene and tetraphenyl-1,2-disilylene.

The divalent germanium-containing groups obtained include those wherein silicon is replaced with germanium in the above-exemplified divalent silicon-containing groups.

The divalent tin-containing groups include those wherein silicon is replaced with tin in the above-exemplified divalent silicon-containing groups.

Examples of $R^5$ are halogen atoms, hydrocarbon groups of 1 to 20 carbon atoms and halogenated hydrocarbon groups of 1 to 20 carbon atoms as described for $R^1$.

Of these, preferred are divalent silicon-containing groups, divalent germanium-containing groups and divalent tin-containing groups, and more preferred are divalent silicon-containing groups. Of these, particularly preferred are alkylsilylene, alkylarylsilylene and arylsilylene.

Listed below are examples of the transition metal compounds represented by the above formula (1).

rac-Dimethylsilylene-bis{1-(2,7-dimethyl-4-ethylindenyl)}zirconium dichloride, rac-Dimethylsilylene-bis{1-(2,7-dimethyl-4-n-propylindenyl)}zirconium dichloride, rac-Dimethylsilylene-bis{1-(2,7-dimethyl-4-i-propylindenyl)}zirconium dichloride, rac-Dimethylsilylene-bis{1-(2,7-dimethyl-4-n-butylindenyl)}zirconium dichloride, rac-Dimethylsilylene-bis{1-(2,7-dimethyl-4-sec-butylindenyl)}zirconium dichloride, rac-Dimethylsilylene-bis{1-(2,7-dimethyl-4-t-butylindenyl)}zirconium dichloride, rac-Dimethylsilylene-bis{1-(2,7-dimethyl-4-n-pentylindenyl)}zirconium dichloride, rac-Dimethylsilylene-bis{1-(2,7-dimethyl-4-n-hexylindenyl)}zirconium dichloride, rac-Dimethylsilylene-bis{1-(2,7-dimethyl-4-cyclohexylindenyl)zirconium dichloride, rac-Dimethylsilylene-bis{1-(2,7-dimethyl-4-methylcyclohexylindenyl)}zirconium dichloride, rac-Dimethylsilylene-bis{1-(2,7-dimethyl-4-phenylethylindenyl)}zirconium dichloride, rac-Dimethylsilylene-bis{1-(2,7-dimethyl-4-phenyldichloromethylindenyl)}zirconium dichloride, rac-Dimethylsilylene-bis{1-(2,7-dimethyl-4-chloromethylindenyl)}zirconium dichloride, rac-Dimethylsilylene-bis{1-(2,7-dimethyl-4-trimethylsilylenemethylindenyl)}zirconium dichloride, rac-Dimethylsilylene-bis{1-(2,7-dimethyl-4-trimethylsiloxymethylindenyl)}zirconium dichloride, rac-Diethylsilylene-bis{1-(2,7-dimethyl-4-i-propylindenyl)}zirconium dichloride, rac-Di(i-propyl)silylene-bis{1-(2,7-dimethyl-4-i-propylindenyl)}zirconium dichloride, rac-Di(n-butyl)silylene-bis{1-(2,7-dimethyl-4-i-propylindenyl)}zirconium dichloride, rac-Di(cyclohexyl)silylene-bis{1-(2,7-dimethyl-4-i-propylindenyl)}zirconium dichloride, rac-Methylphenylsilylene-bis{1-(2,7-dimethyl-4-i-propylindenyl)}zirconium dichloride, rac-Methylphenylsilylene-bis(1-(2,7-dimethyl-4-t-butylindenyl)}zirconium dichloride, rac-Diphenylsilylene-bis{1-(2,7-dimethyl-4-t-butylindenyl)}zirconium dichloride, rac-Diphenylsilylene-bis{1-(2,7-dimethyl-4-i-propylindenyl)}zirconium dichloride, rac-Diphenylsilylene-bis{1-(2,7-dimethyl-4-ethylindenyl)}zirconium dichloride, rac-Di(p-tolyl)silylene-bis{1-(2,7-dimethyl-4-i-propylindenyl)}zirconium dichloride, rac-Di(p-chlorophenyl)silylene-bis{1-(2,7-dimethyl-4-i-propylindenyl)}zirconium dichloride, rac-Dimethylsilylene-bis{1-(2-methyl-4-i-propyl-7-ethylindenyl)zirconium dibromide, rac-Dimethylsilylene-bis{1-(2,7-dimethyl-4-i-propylindenyl)}zirconium dimethyl, rac-Dimethylsilylene-bis{1-(2,7-dimethyl-4-i-propylindenyl)}zirconium methylchloride, rac-Dimethylsilylene-bis{1-(2,7-dimethyl-4-i-propylindenyl)}zirconium-bis (trifluoromethanesulfonato), rac-Dimethylsilylene-bis{1-(2,7-dimethyl-4-i-propylindenyl)}zirconium-bis(p-phenylsulfinato), and rac-Dimethylsilylene-bis{1-(2-phenyl-4-i-propyl-7-methylindenyl)}zirconium dichloride.

Of the transition metal compounds represented by the above formula (1), those represented by the following formula (1-a) is particularly preferably used in the invention:

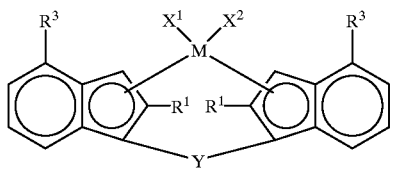

(1-a)

wherein M, $X^1$, $X^2$, $R^1$, $R^3$ and Y have the same meanings as defined in the formula (1), and $R^1$ is preferably hydrogen, methyl or an aromatic group.

Listed below are preferred examples of the transition metal compounds represented by the above formula (1-a).

rac-Dimethylsilylene-bis{1-(4-phenylindenyl)}zirconium dichloride,
rac-Dimethylsilylene-bis{1-(2-methyl-4-phenylindenyl)}zirconium dichloride,
rac-Dimethylsilylene-bis{1-(2-methyl-4-(α-naphthyl)indenyl)}zirconium dichloride,
rac-Dimethylsilylene-bis{1-(2-methyl-4-(β-naphthyl)indenyl)}zirconium dichloride,
rac-Dimethylsilylene-bis{1-(2-methyl-4-(1-anthracenyl)indenyl)}zirconium dichloride,
rac-Dimethylsilylene-bis{1-(2-methyl-4-(2-anthracenyl)indenyl)}zirconium dichloride,
rac-Dimethylsilylene-bis{1-(2-methyl-4-(9-anthracenyl)indenyl)}zirconium dichloride,
rac-Dimethylsilylene-bis{1-(2-methyl-4-(9-phenanthryl)indenyl)}zirconium dichloride,
rac-Dimethylsilylene-bis{1-(2-methyl-4-(p-fluorophenyl)indenyl)}zirconium dichloride,
rac-Dimethylsilylene-bis{1-(2-methyl-4-(pentafluorophenyl)indenyl)}zirconium dichloride,
rac-Dimethylsilylene-bis{1-(2-methyl-4-(p-chlorophenyl)-1-indenyl)}zirconium dichloride,
rac-Dimethylsilylene-bis{1-(2-methyl-4-(m-chlorophenyl)indenyl)}zirconium dichloride,
rac-Dimethylsilylene-bis{1-(2-methyl-4-(o-chlorophenyl)indenyl)}zirconium dichloride,
rac-Dimethylsilylene-bis{1-(2-methyl-4-(o,p-dichlorophenyl)indenyl)}zirconium dichloride,
rac-Dimethylsilylene-bis{1-(2-methyl-4-(p-bromophenyl)indenyl)}zirconium dichloride,
rac-Dimethylsilylene-bis{1-(2-methyl-4-(p-tolyl)indenyl)}zirconium dichloride,
rac-Dimethylsilylene-bis{1-(2-methyl-4-(m-tolyl)indenyl)}zirconium dichloride,
rac-Dimethylsilylene-bis{1-(2-methyl-4-(o-tolyl)indenyl)}zirconium dichloride,
rac-Dimethylsilylene-bis{1-(2-methyl-4-(o,o'-dimethylphenyl)indenyl)}zirconium dichloride,
rac-Dimethylsilylene-bis{1-(2-methyl-4-(p-ethylphenyl)indenyl)}zirconium dichloride,
rac-Dimethylsilylene-bis{1-(2-methyl-4-(p-i-propylphenyl)indenyl)}zirconium dichloride,
rac-Dimethylsilylene-bis{1-(2-methyl-4-(p-benzylphenyl)indenyl)}zirconium dichloride,
rac-Dimethylsilylene-bis{1-(2-methyl-4-(p-biphenylyl)indenyl)}zirconium dichloride,
rac-Dimethylsilylene-bis{1-(2-methyl-4-(m-biphenylyl)indenyl)}zirconium dichloride,
rac-Dimethylsilylene-bis{1-(2-methyl-4-(p-trimethylsilylenephenyl) indenyl)}zirconium dichloride,
rac-Dimethylsilylene-bis{1-(2-methyl-4-(m-trimethylsilylenephenyl)indenyl)}zirconium dichloride,
rac-Dimethylsilylene-bis{1-(2-phenyl-4-phenylindenyl)}zirconium dichloride,
rac-Diethylsilylene-bis{1-(2-methyl-4-phenylindenyl)}zirconium dichloride,
rac-Di(i-propyl)silylene-bis{1-(2-methyl-4-phenylindenyl)}zirconium dichloride,
rac-Di(n-butyl)silylene-bis{1-(2-methyl-4-phenylindenyl)}zirconium dichloride,
rac-Dicyclohexylsilylene-bis{1-(2-methyl-4-phenylindenyl)}zirconium dichloride,
rac-Methylphenylsilylene-bis{1-(2-methyl-4-phenylindenyl)}zirconium dichloride,
rac-Diphenylsilylene-bis{1-(2-methyl-4-phenylindenyl)}zirconium dichloride,
rac-Di(p-tolyl)silylene-bis{1-(2-methyl-4-phenylindenyl)}zirconium dichloride,
rac-Di(p-chlorophenyl)silylene-bis{1-(2-methyl-4-phenylindenyl)}zirconium dichloride,
rac-Methylene-bis{1-(2-methyl-4-phenylindenyl)}zirconium dichloride,
rac-Ethylene-bis{1-(2-methyl-4-phenylindenyl)}zirconium dichloride,
rac-Dimethylgermylene-bis{1-(2-methyl-4-phenylindenyl)}zirconium dichloride,
rac-Dimethylstannylene-bis{1-(2-methyl-4-phenylindenyl)}zirconium dichloride,
rac-Dimethylsilylene-bis{1-(2-methyl-4-phenylindenyl)}zirconium dibromide,
rac-Dimethylsilylene-bis{1-(2-methyl-4-phenylindenyl)}zirconium dimethyl,
rac-Dimethylsilylene-bis{1-(2-methyl-4-phenylindenyl)}zirconium methylchloride,
rac-Dimethylsilylene-bis{1-(2-methyl-4-phenylindenyl)}zirconium chloride $SO_2Me$,
rac-Dimethylsilylene-bis{1-(2-methyl-4-phenylindenyl)}zirconium chloride $OSO_2Me$,
rac-Dimethylsilylene-bis{1-(2-methyl-4-phenylindenyl)}zirconium mono(trifluoromethanesulfonate),
rac-Dimethylsilylene-bis{1-(2-methyl-4-phenylindenyl)}zirconium di(trifluoromethanesulfonate),
rac-Dimethylsilylene-bis{1-(2-methyl-4-phenylindenyl)}zirconium di(p-toluenesulfonate),
rac-Dimethylsilylene-bis{1-(2-methyl-4-phenylindenyl)}zirconium di(methylsulfonate),
rac-Dimethylesilylene-bis{1-(2-methyl-4-phenylindenyl)}zirconium di(trifluoroacetate),
rac-Dimethylsilylene-bis{1-(2-methyl-4-phenylindenyl)}zirconium monochloride mono(n-butoxyde),
rac-Dimethylsilylene-bis{1-(2-methyl-4-phenylindenyl)}zirconium di(n-butoxyde),
rac-Dimethylsilylene-bis{1-(2-methyl-4-phenylindenyl)}zirconium monochloride mono(phenoxyde),
rac-Dimethylsilylene-bis{1-(2-methyl-4-phenylindenyl)}titanium dichloride, and
rac-Dimethylsilylene-bis{1-(2-methyl-4-phenylindenyl)}hafnium dichloride.

Of the above compounds, particularly preferred are compounds of the formula (1-a) wherein $R^1$ is methyl.

Also preferably used are transition metal compounds of the formula (1-a) wherein $R^1$ is a hydrocarbon group of 2 to 6 carbon atoms and $R^3$ is an aryl group of 6 to 16 carbon atoms. Examples of such compounds are listed below.

rac-Dimethylsilylene-bis{1-(2-ethyl-4-phenylindenyl)}zirconium dichloride,
rac-Dimethylsilylene-bis{1-(2-ethyl-4-(α-naphthyl)indenyl)}zirconium dichloride,
rac-Dimethylsilylene-bis{1-(2-ethyl-4-(β-naphthyl)indenyl}zirconium dichloride,
rac-Dimethylsilylene-bis{1-(2-ethyl-4-(2-methyl-1-naphthyl)indenyl}zirconium dichloride,
rac-Dimethylsilylene-bis{1-(2-ethyl-4-(5-acenaphthyl)indenyl)}zirconium dichloride,
rac-Dimethylsilylene-bis{1-(2-ethyl-4-(9-anthracenyl)indenyl)}zirconium dichloride,
rac-Dimethylsilylene-bis{1-(2-ethyl-4-(9-phenanthryl)indenyl)}zirconium dichloride,
rac-Dimethylsilylene-bis{1-(2-ethyl-4-(o-methylphenyl)indenyl)}zirconium dichloride,
rac-Dimethylsilylene-bis{1-(2-ethyl-4-(m-methylphenyl)indenyl)}zirconium dichloride,
rac-Dimethylsilylene-bis{1-(2-ethyl-4-(p-methylphenyl)indenyl)}zirconium dichloride,
rac-Dimethylsilylene-bis{1-(2-ethyl-4-(2,3-dimethylphenyl)indenyl)}zirconium dichloride,
rac-Dimethylsilylene-bis{1-(2-ethyl-4-(2,4-dimethylphenyl)indenyl)}zirconium dichloride,
rac-Dimethylsilylene-bis{1-(2-ethyl-4-(2,5-dimethylphenyl)indenyl)}zirconium dichloride,
rac-Dimethylsilylene-bis{1-(2-ethyl-4-(2,4,6-trimethylphenyl)indenyl)}zirconium dichloride,
rac-Dimethylsilylene-bis{1-(2-ethyl-4-(o-chlorophenyl)indenyl)}zirconium dichloride,
rac-Dimethylsilylene-bis{1-(2-ethyl-4-(m-chlorophenyl)indenyl)}zirconium dichloride,
rac-Dimethylsilylene-bis{1-(2-ethyl-4-(p-chlorophenyl)indenyl)}zirconium dichloride,
rac-Dimethylsilylene-bis{1-(2-ethyl-4-(2,3-dichlorophenyl)indenyl)}zirconium dichloride,
rac-Dimethylsilylene-bis{1-(2-ethyl-4-(2,6-dichlorophenyl)indenyl)}zirconium dichloride,
rac-Dimethylsilylene-bis{1-(2-ethyl-4-(3,5-dichlorophenyl)indenyl)}zirconium dichloride,
rac-Dimethylsilylene-bis{1-(2-ethyl-4-(2-bromophenyl)indenyl)}zirconium dichloride,
rac-Dimethylsilylene-bis{1-(2-ethyl-4-(3-bromophenyl)indenyl)}zirconium dichloride,
rac-Dimethylsilylene-bis{1-(2-ethyl-4-(4-bromophenyl)indenyl)}zirconium dichloride,
rac-Dimethylsilylene-bis{1-(2-ethyl-4-(4-biphenylyl)indenyl)}zirconium dichloride,
rac-Dimethylsilylene-bis{1-(2-ethyl-4-(4-trimethylsilylphenyl)indenyl)}zirconium dichloride,
rac-Dimethylsilylene-bis{1-(2-n-propyl-4-phenylindenyl)}zirconium dichloride,
rac-Dimethylsilylene-bis{1-(2-n-propyl-4-(α-naphthyl)indenyl)}zirconium dichloride,
rac-Dimethylsilylene-bis{1-(2-n-propyl-4-(β-naphthyl)indenyl)}zirconium dichloride,
rac-Dimethylsilylene-bis{1-(2-n-propyl-4-(2-methyl-1-naphthyl)indenyl)}zirconium dichloride,
rac-Dimethylsilylene-bis{1-(2-n-propyl-4-(5-acenaphthyl)indenyl)}zirconium dichloride,
rac-Dimethylsilylene-bis{1-(2-n-propyl-4-(9-anthracenyl)indenyl)}zirconium dichloride,
rac-Dimethylsilylene-bis{1-(2-n-propyl-4-(9-phenanthryl)indenyl)}zirconium dichloride,
rac-Dimethylsilylene-bis{1-(2-i-propyl-4-phenylindenyl)}zirconium dichloride,
rac-Dimethylsilylene-bis{1-(2-i-propyl-4-(α-naphthyl)indenyl)}zirconium dichloride,
rac-Dimelhylsilylene-bis{1-(2-i-propyl-4-(β-naphthyl)indenyl)}zirconium dichloride,
rac-Dimethylsilylene-bis{1-(2-i-propyl-4-(2-methyl-1-naphthyl)indenyl)}zirconium dichloride,
rac-Dimethylsilylene-bis{1-(2-i-propyl-4-(5-acenaphthyl)indenyl)}zirconium dichloride,
rac-Dimethylsilylene-bis{1-(2-i-propyl-4-(9-anthracenyl)indenyl)}zirconium dichloride,
rac-Dimethylsilylene-bis{1-(2-i-propyl-4-(9-phenanthryl)iridenyl)}zirconium dichloride,
rac-Dimethylsilylene-bis1-(2-s-butyl-4-phenylindenyl)}zirconium dichloride,
rac-Dimethylsilylene-bis{1-(2-s-butyl-4-(α-naphthyl)indenyl)}zirconium dichloride,
rac-Dimethylsilylene-bis{1-(2-s-butyl-4-(β-naphthyl)indenyl)}zirconium dichloride,
rac-Dimethylsilylene-bis{1-(2-s-butyl-4-(8-methyl-9-naphthyl)indenyl)}zirconium dichloride,
rac-Dimethylsilylene-bis{1-(2-s-butyl-4-(5-acenaphthyl)indenyl)}zirconium dichloride,
rac-Dimethylsilylene-bis{1-(2-s-butyl-4-(9-anthracenyl)indenyl)}zirconium dichloride,
rac-Dimethylsilylene-bis{1-(2-s-butyl-4-(9-phenanthryl)indenyl)}zirconium dichloride,
rac-Dimethylsilylene-bis{1-(2-n-pentyl-4-phenylindenyl)}zirconium dichloride,
rac-Dimethylsilylene-bis{1-(2-n-pentyl-4-(α-naphthyl)indenyl)}zirconium dichloride,
rac-Dimethylsilylene-bis{1-(2-n-butyl-4-phenylindenyl)}zirconium dichloride,
rac-Dimethylsilylene-bis{1-(2-n-butyl-4-(α-naphthyl)indenyl)}zirconium dichloride,
rac-Dimethylsilylene-bis{1-(2-n-butyl-4-(β-naphthyl)indenyl)}zirconium dichloride,
rac-Dimethylsilylene-bis{1-(2-n-butyl-4-(2-methyl-1-naphthyl)indenyl)}zirconium dichloride,
rac-Dimethylsilylene-bis{1-(2-n-butyl-4-(5-acenaphthyl)indenyl)}zirconium dichloride,
rac-Dimethylsilylene-bis{1-(2-n-butyl-4-(9-anthracenyl)indenyl)}zirconium dichloride,
rac-Dimethylsilylene-bis{1-(2-n-butyl-4-(9-phenanthryl)indenyl)}zirconium dichloride,
rac-Dimethylsilylene-bis{1-(2-i-butyl-4-phenylindenyl)}zirconium dichloride,
rac-Dimethylsilylene-bis{1-(2-i-butyl-4-(α-naphthyl)indenyl)}zirconium dichloride,
rac-Dimethylsilylene-bis{1-(2-i-butyl-4-(β-naphthyl)indenyl)}zirconium dichloride,
rac-Dimethylsilylene-bis{1-(2-i-butyl-4-(2-methyl-1-naphthyl)indenyl)}zirconium dichloride, rac-Dimethylsilylene-bis{1-(2-i-butyl-4-(5-acenaphthyl) indenyl)}zirconium dichloride,
rac-Dimethylsilylene-bis{1-(2-i-butyl-4-(9-anthracenyl) indenyl)}zirconium dichloride,
rac-Dimethylsilylene-bis{1-(2-i-butyl-4-(9-phenanthryl) indenyl)}zirconium dichloride,
rac-Dimethylsilylene-bis{1-(2-neopentyl-4-phenylindenyl)}zirconium dichloride,
rac-Dimethylsilylene-bis{1-(2-neopentyl-4-(α-naphthyl) indenyl)}zirconium dichloride,
rac-Dimethylsilylene-bis{1-(2-n-hexyl-4-phenylindenyl)}zirconium dichloride,
rac-Dimethylsilylene-bis{1-(2-n-hexyl-4-(α-naphthyl) indenyl)}zirconium dichloride,
rac-Methylphenylsilylene-bis{1-(2-ethyl-4-phenylindenyl)}zirconium dichloride,
rac-Methylphenylsilylene-bis{1-(2-ethyl-4-(α-naphthyl) indenyl)}zirconium dichloride,
rac-Methylphenylsilylene-bis{1-(2-ethyl-4-(9-anthracenyl)indenyl)}zirconium dichloride,
rac-Methylphenylsilylene-bis{1-(2-ethyl-4-(9-phenanthryl)indenyl)}zirconium dichloride,
rac-Diphenylsilylene-bis{1-(2-ethyl-4-phenylindenyl)}zirconium dichloride,
rac-Diphenylsilylene-bis{1-(2-ethyl-4-(α-naphthyl) indenyl)}zirconium dichloride,
rac-Diphenylsilylene-bis{1-(2-ethyl-4-(9-anthracenyl) indenyl)}zirconium dichloride,
rac-Diphenylsilylene-bis{1-(2-ethyl-4-(9-phenanthryl) indenyl)}zirconium dichloride,
rac-Diphenylsilylene-bis{1-(2-ethyl-4-(4-biphenylyl) indenyl)}zirconium dichloride,
rac-Methylene-bis{1-(2-ethyl-4-phenylindenyl)}zirconium dichloride,
rac-Methylene-bis{1-(2-ethyl-4-(α-naphthyl)indenyl)}zirconium dichloride,
rac-Ethylene-bis{1-(2-ethyl-4-phenylindenyl)}zirconium dichloride,
rac-Ethylene-bis{1-(2-ethyl-4-(α-naphthyl)indenyl)}zirconium dichloride,
rac-Ethylene-bis{1-(2-n-propyl-4-(α-naphthyl)indenyl)}zirconium dichloride,
rac-Dimethylgermylene-bis{1-(2-ethyl-4-phenylindenyl)}zirconium dichloride,
rac-Dimethylgermylene-bis{1-(2-ethyl-4-(α-naphthyl) indenyl)}zirconium dichloride,
rac-Dimethylgermylene-bis{1-(2-n-propyl-4-phenylindenyl)}zirconium dichloride,
rac-Dimethylstannylene-bis{1-(2-ethyl-4-phenylindenyl)}zirconium dichloride,
rac-Dimethylstannylene-bis{1-(2-ethyl-4-(α-naphthyl) indenyl)}zirconium dichloride,
rac-Dimethylstannylene-bis{1-(2-n-ethyl-4-(9-phenanthryl)indenyl)}zirconium dichloride, and
rac-Dimethylstannylene-bis{1-(2-n-propyl-4-phenylindenyl)}zirconium dichloride.

In the present invention, also employable are transition metal compounds wherein zirconium metal is replaced with titanium, hafnium, vanadium, niobium, tantalum, chromium, molybdenum or tungsten in the above-exemplified compounds.

The transition metal compounds are generally used in the form of racemic modification as the olefin polymerization catalyst component, but they can also be used either in the form of R type or S type.

The transition metal compounds used for the invention can be prepared in accordance with "Journal of Organometallic Chem.", 288 (1985), pp. 63–67 and EP-A-0320762. For example, the compounds of the formula (1-a) can be prepared by the following reaction route.

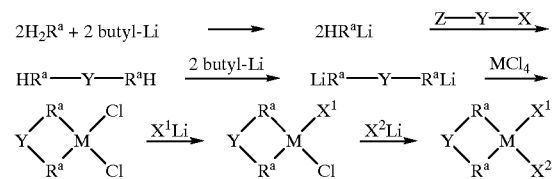

wherein Z is Cl, Br, I or o-tosyl group, and $H_2R^a$ is

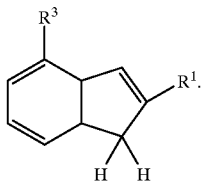

The organoaluminum oxy-compound (b-1) (hereinafter sometimes referred to as "component (b-1)") for forming the olefin polymerization catalyst used in the invention may be either aluminoxane conventionally known or a benzene-insoluble organoaluminum oxy-compound, the latter is described in, for example, Japanese Patent Laid-Open Publication No. 78687/1990.

The conventionally known aluminoxane can be prepared by, for example, the following procedures.

(1) An organoaluminum compound, e.g., trialkylaluminum, is added to a hydrocarbon medium suspension of compounds containing adsorbed water or salts containing water of crystallization, e.g., magnesium chloride hydrate, copper sulfate hydrate, aluminum sulfate hydrate, nickel sulfate hydrate and cerous chloride hydrate, so as to allow the organoaluminum compound to react with the adsorbed water or the water of crystallization.

(2) Water, ice or water vapor is allowed to directly act on an organoaluminum compound, e.g., trialkylaluminum, in a medium such as benzene, toluene, ethyl ether or tetrahydrofuran.

(3) An organotin oxide such as dimethyltin oxide or dibutyltin oxide is allowed to react with an organoaluminum compound, e.g., trialkylaluminum, in a medium such as decane, benzene or toluene.

The aluminoxane may contain a small amount of an organometallic component. Solutions of the aluminoxane obtained above may be used in the invention, but it is also possible that the solvent or the unreacted organoaluminum compound is distilled off from the solutions and then the residue is redissolved in a solvent or suspended in a poor solvent for aluminoxane.

Examples of the organoaluminum compounds used for preparing the aluminoxane include:
trialkylaluminums, such as trimethylaluminum, triethylaluminum, tripropylaluminum, triisopropylaluminum, tri-n-butylaluminum, triisobutylaluminum, tri-sec-butylaluminum, tri-tert-butylaluminum, tripentylaluminum, trihexylaluminum, trioctylaluminum and tridecylaluminum;

tricycloalkylaluminums, such as tricyclohexylaluminum and tricyclooctylaluminum;

dialkylaluminum halides, such as dimethylaluminum chloride, diethylaluminum chloride, diethylaluminum bromide and diisobutylaluminum chloride;

dialkylaluminum hydrides, such as diethylaluminum hydride and diisobutylaluminum hydride;

dialkylaluminum alkoxides, such as dimethylaluminum methoxide and diethylaluminum ethoxide; and dialkylaluminum aryloxides, such as diethylaluminum phenoxide.

Of these, preferred are trialkylaluminums and tricycloalkylaluminums, and particularly preferred is trimethylaluminum.

Also employable as the organoaluminum compound used for preparing the aluminoxane are alkenylaluminums represented by the following formula:

$$(iC_4H_9)_xAl_y(C_5H_{10})_z$$

wherein x, y and z are each a positive number, and $z \geq 2x$, such as isoprenylaluminum.

The organoaluminum compounds mentioned above are used singly or in combination.

Examples of the solvents used for preparing solutions and suspensions of the aluminoxane include aromatic hydrocarbons, such as benzene, toluene, xylene, cumene and cymene; aliphatic hydrocarbons, such as pentane, hexane, heptane, octane, decane, dodecane, hexadecane and octadecane; alicyclic hydrocarbons, such as cyclopentane, cyclohexane, cyclooctane and methylcyclopentane; petroleum fractions, such as gasoline, kerosine and gas oil; and halogenated derivatives of these aromatic, aliphatic and alicyclic hydrocarbons, particularly chlorides and bromides thereof. Also employable are ethers such as ethyl ether and tetrahydrofuran. Of these solvents, preferred are aromatic hydrocarbons and aliphatic hydrocarbons.

The compound (b-2) capable of reacting with the transition metal compound (a) to form an ion pair (hereinafter sometimes referred to as "component (b-2)"), that is used for forming the olefin polymerization catalyst according to the invention, includes Lewis acids, ionic compounds and carborane compounds, as described in, for example, Japanese Patent Laid-Open Publications No. 501950/1989, No. 502036/1989, No. 179005/1991, No. 179006/1991, No. 207703/1991 and No. 207704/1991, and U.S. Pat. No. 547,718.

Examples of the Lewis acids include triphenylboron, tris(4-fluorophenyl)boron, tris(p-tolyl)boron, tris(o-tolyl) boron, tris(3,5-dimethylphenyl)boron, tris (pentafluorophenyl)boron, $MgCl_2$, $Al_2O_3$ and $SiO_2$—$Al_2O_3$.

Examples of the ionic compounds include triphenylcarbeniumtetrakis(pentafluorophenyl)borate, tri-n-butylammoniumtetrakis(pentafluorophenyl)borate, N,N-dimethylaniliniumtetrakis(pentafluorophenyl)borate and ferroceniumtetrakis(pentafluorophenyl)borate.

Examples of the carborane compounds include dodecaborane, 1-carbaundecaborane, bis-n-butylammonium (1-carbedodeca)borate, tri-n-butylammonium(7,8-dicarbaundeca)borate and tri-n-butylammonium (tridecahydride-7-carbaundeca)borate.

The compounds (b-2) capable of reacting with the transition metal compound (a) to form an ion pair can be used alone or in combination.

The organoaluminum compound (c) (hereinafter sometimes referred to as "component (c)") for forming the olefin polymerization catalyst used in the invention can be represented by, for example, the following formula (2):

$$R^9{}_nAlX_{3-n} \qquad (2)$$

wherein $R^9$ is a hydrocarbon group of 1 to 12 carbon atoms, X is a halogen atom or a hydrogen atom, and n is 1 to 3.

In the above formula (2), $R^9$ is a hydrocarbon group of 1 to 12 carbon atoms, for example, an alkyl group, a cycloalkyl group or an aryl group. Particular examples thereof include methyl, ethyl, n-propyl, isopropyl, isobutyl, pentyl, hexyl, octyl, cyclopentyl, cyclohexyl, phenyl and tolyl.

Examples of the organoaluminum compounds (c) include:

trialkylaluminums, such as trimethylaluminum, triethylaluminum, triisopropylaluminum, triisobutylaluminum, trioctylaluminum, tri(2-ethylhexyl)aluminum and tridecylaluminum;

alkenylaluminums, such as isoprenylaluminum;

dialkylaluminum halides, such as dimethylaluminum chloride, diethylaluminum chloride, diisopropylaluminum chloride, diisobutylaluminum chloride and dimethylaluminum bromide;

alkylaluminum sesquihalides, such as methylaluminum sesquichoride, ethylaluminum sesquichloride, isopropylaluminum sesquichloride, butylaluminum sesquichloride and ethylaluminum sesquibromide;

alkylaluminum dihalides, such as methylaluminum dichloride, ethylaluminum dichloride, isopropylaluminum dichloride and ethylaluminum dibromide; and alkylaluminum hydrides, such as diethylaluminum hydride and diisobutylaluminum hydride.

Also employable as the organoaluminum compound (c) is a compound represented by the following formula (3):

$$R^9{}_nAlL_{3-n} \qquad (3)$$

wherein $R^9$ is the same as in the above formula (2); L is —$OR^{10}$ group, —$OSiR^{11}{}_3$ group, —$OAlR^{12}{}_2$ group, —$NR^{13}{}_2$ group, —$SiR^{14}{}_3$ group or —$N(R^{15})AlR^{16}{}_2$ group; n is 1 to 2; $R^{10}$, $R^{11}$, $R^{12}$ and $R^{16}$ are each methyl, ethyl, isopropyl, isobutyl, cyclohexyl, phenyl or the like, $R^{13}$ is hydrogen, methyl, ethyl, isopropyl, phenyl, trimethylsilylene or the like; and $R^{14}$ and $R^{15}$ are each methyl, ethyl or the like.

Of such organoaluminum compounds, preferred are those of $R^9{}_nAl(OAlR^{12}{}_2)_{3-n}$, for example, $Et_2AlOAlEt_2$ and $(iso-Bu)_2AlOAl(iso-Bu)_2$.

Of the organoaluminum compounds represented by the formulas (2) and (3), preferred are those of the formula $R^9{}_3Al$ wherein $R^9$ is particularly preferably an isoalkyl group.

The olefin polymerization catalyst used in the invention car be prepared by mixing the component (a) and the component (b-1) (or the component (b-2)), and optionally, the component (c) in an inert hydrocarbon solvent or an olefin solvent.

Examples of the inert hydrocarbon solvents used for preparing the olefin polymerization catalyst include aliphatic hydrocarbons, such as propane, butane, pentane, hexane, heptane, octane, decane, dodecane and kerosine; alicyclic hydrocarbons, such as cyclopentane, cyclohexane and methylcyclopentane; aromatic hydrocarbons, such as benzene, toluene and xylene; halogenated hydrocarbons, such as ethylene chloride, chlorobenzene and dichloromethane; and mixtures of these solvents.

The above components may be mixed in any order, but it is preferred that:

the component (b-1) (or the component (b-2)) is mixed with the component (a);

the component (b-1) is first mixed with the component (c) and then with the component (a);

the component (a) is first mixed with the component (b-1) (or the component (b-2)) and then with the component (c); or the component (a) is first mixed with the component (c) and then with the component (b-1) (or the component (b-2)).

In the mixing of the above components, an atomic ratio of aluminum in the component (b-1) to the transition metal in the transition metal compound (a), (Al/transition metal), may be in the range of usually 10 to 10,000, preferably 20 to 5,000, and a concentration of the component (a) may be in the range of about $10^{-8}$ to $10^{-1}$ mol/liter, preferably $10^{-7}$ to $5 \times 10^{-2}$ mol/liter.

When the component (b-2) is used, a molar ratio of the component (a) to the component (b-2), (component (a)/component (b-2)), may be in the range of usually 0.01 to 10, preferably 0.1 to 5, and a concentration of the component (a) may be in the range of about $10^{-8}$ to $10^{-1}$ mol/liter, preferably $10^{-7}$ to $5 \times 10^{-2}$ mol/liter.

When the component (c) is used, an atomic ratio of the aluminum atom ($Al_c$) in the component (c) to the aluminum atom ($Al_{b-1}$) in the component (b-1), ($Al_c/Al_{b-1}$), may be in the range of usually 0.02 to 20, preferably 0.2 to 10.

The above-mentioned catalyst components may be mixed in a polymerization reactor, or a mixture of the components preliminarily prepared may be added to the reactor.

If the components are preliminarily mixed, the mixing temperature may be in the range of usually –50 to 150° C., preferably –20 to 120° C.; and the contact time may be in the range of 1 to 1,000 minutes, preferably 5 to 600 minutes. It is possible to vary the mixing temperature during the mixing procedure.

The olefin polymerization catalyst used in the invention may be a solid olefin polymerization catalyst in which at least one of the above components (a), (b) and (c) is supported on an inorganic or organic, granular or fine particulate solid carrier.

The inorganic carrier is preferably a porous oxide, and examples thereof include $SiO_2$ and $Al_2O_3$.

Examples of the granular or particulate solid organic compounds include polymers and copolymers produced by using α-olefins (e.g., ethylene, propylene and 1-butene) or styrene, as their major component.

The olefin polymerization catalyst used in the invention may be one which is formed from the fine particulate carrier, the component (a), the component (b) and an olefin polymer produced by prepolymerization, and optionally, the component (c).

In the prepolymerization, olefins, such as propylene, ethylene and 1-butene, can be employed. Also employable are mixtures of these and other olefins.

In addition to the above components, the olefin polymerization catalyst used in the invention may further contain other components useful for the olefin polymerization, for example, water as a catalyst component.

The propylene-1-butene random copolymer used in the invention can be prepared by copolymerizing propylene and 1-butene in the presence of the above-mentioned olefin polymerization catalyst in such a manner that the monomer composition as defined above would be finally obtained.

The polymerization can be carried out by any of a liquid phase polymerization process (e.g., suspension or solution polymerization process) and a gas phase polymerization process.

In the liquid phase polymerization process, inert hydrocarbon solvents such as those used for preparing the catalyst previously mentioned can be employed, and propylene per se is also employable as a solvent.

The polymerization temperature may be, in the suspension polymerization process, in the range of usually –50 to 100° C., preferably 0 to 90° C.; in the solution polymerization process, in the range of usually 0 to 250° C., preferably 20 to 200° C.; and in the gas phase polymerization process, in the range of usually 0 to 120° C., preferably 20 to 100° C. The polymerization pressure may be in the range of usually atmospheric pressure to 100 kg/cm², preferably atmospheric pressure to 50 kg/cm². The polymerization reaction can be carried out either batchwise, semicontinuously or continuously. The polymerization can also be carried out in two or more stages under different reaction conditions.

The molecular weight of the resulting propylene-1-butene random copolymer can be regulated by adding hydrogen to the polymerization system or by varying the polymerization temperature or the polymerization pressure.

Polypropylene Composition

The polypropylene composition of the invention comprises:

the polypropylene (A) in an amount of 5 to 95% by weight, preferably 20 to 90% by weight, more preferably 40 to 85% by weight, and the propylene-1-butene random copolymer (B) in an amount of 95 to 5% by weight, preferably 80 to 10% by weight and 60 to 15% by weight.

The polypropylene composition can be prepared by any conventionally known process for preparing resin compositions, for example, by melt-kneading the polypropylene (A) and the propylene-1-butene random copolymer (B).

The melt flow rate MFR of the polypropylene composition may be in the range of 0.1 to 400 g/10 min, preferably 1 to 100 g/10 min.

The melting point of the polypropylene composition may be in the range of 60 to 165° C., preferably 80 to 160° C.

In addition to the polypropylene and the propylene-1-butene random copolymer, the propylene composition of the invention may contain additives and other resins so long as the objects of the invention are not marred.

Examples of such additives include nucleating agents, antioxidants, hydrochloric acid absorbers, heat stabilizers, light stabilizers, ultraviolet light absorbers, lubricants, anti-static agents, flame retardants, pigments, dyes, dispersing agents, copper inhibitors, neutralizing agents, foaming agents, plasticizers, anti-foaming agents, crosslinking agents, flowability improvers such as peroxides, and weld strength improvers.

As the antioxidants, phenolic antioxidants, sulfur antioxidants, phosphorus antioxidants, etc. are employable.

Examples of the phenolic antioxidants include phenols compounds, such as 2,6-di-tert-butyl-p-cresol, stearyl(3,3-dimethyl-4-hydroxybenzyl)thioglycolate, stearyl-β-(4-hydroxy-3,5-di-tert-butylphenyl)propionate, distearyl-3,5-di-tert-butyl-4-hydroxybenzyl phosphonate, 2,4,6-tris(3',5'-di-tert-butyl-4'-hydroxybenzylthio)-1,3,5-triazine, distearyl (4-hydroxy-3-methyl-5-tert-butylbenzyl)malonate, 2,2'-methylenebis(4-methyl-6-tert-butylphenol), 4,4'-methylenebis(2,5-di-tert-butylphenol), 2,2'-methylenebis[6-(1-methylcyclohexyl)p-cresol], bis[3,5-bis(4-hydroxy-3-tert-butylphenyl)butyric acid] glycol ester, 4,4'-butylidenebis(6-tert-butyl-m-cresol), 1,1,3-tris(2-methyl-4-hydroxy-5-tert-butylphenyl)butane, bis[2-tert-butyl-4-methyl-6-(2-hydroxy-3-tert-butyl-5-methylbenzyl)phenyl] terephthalate, 1,3,5-tris(2,6-dimethyl-3-hydroxy-4-tertbutyl)benzyl isocyanurate, 1,3,5-tris(3,5-di-tert-butyl-4-hydroxybenzyl)-2,4,6-trimethylbenzene, tetrakis [methylene-3-(3,5-di-tert-butyl-4-hydroxyphenyl) propionate]methane, 1,3,5-tris(3,5-di-tert-butyl-4-hydroxybenzyl) isocyanurate, 1,3,5-tris[( 3,5-di-tert-butyl-4-hydroxyphenyl)propionyloxyethyl] isocyanurate, 2-octylthio-4,6-di(4-hydroxy-3,5-di-tert-butyl)phenoxy-1,3,5-triazine and 4,4$^1$-thiobis(6-tert-butyl-m-cresol); and polyhydric phenol carbonic acid oligo esters, such as carbonic acid oligo esters of 4,4'-butylidenebis(2-tert-butyl-5-methylphenol) (e.g., polymerization degree: 2 to 10).

Examples of the sulfur antioxidants include dialkyl thiodipropionates, such as dilauryl thiodipropionate, dimyristyl thiodipropionate and distearyl thiodipropionate; and esters of polyhydric alcohols (e.g., glycerol, trimethylolethane, trimethylolpropane, pentaerythritol and trishydroxyethyl isocyanurate) and alkylthiopropionic acids (e.g., butylthiopropionic acid, octylthiopropionic acid, laurylthiopropionic acid and stearylthiopropionic acid), such as pentaerythritoltetralauryl thiopropionate.

Examples of the phosphorus antioxidants include trioctyl phosphite, trilauryl phosphite, tridecyl phosphite, octyldiphenyl phosphite, tris(2,4-di-tert-butylphenyl) phosphite, triphenyl phosphite, tris(butoxyethyl) phosphite, tris (nonylphenyl) phosphite, distearylpentaerythritol diphosphite, tetra(tridecyl)-1,1,3-tris(2-methyl-5-tert-butyl-4-hydroxyphenyl)butane diphosphite, tetra($C_{12}$–$C_{15}$ mixed alkyl)-4,4'-isopropylidenediphenyl diphosphite, tetra (tridecyl)-4,4'-butylidenebis(3-methyl-6-tert-butylphenol) diphosphite, tris(3,5-di-tert-butyl-4-hydroxyphenyl) phosphite, tris(mono-di mixed nonylphenyl) phosphite, hydrogenated 4,4'-isopropylidenediphenol polyphosphite, bis(octylphenyl) .bis 4,4'-butylidenebis(3-methyl-6-tert-butylphenol)).1,6-hexanediol diphosphite, phenyl-4,4'-isopropylidenediphenol pentaerythritol diphosphite, bis(2,4-di-tert-butylphenyl)pentaerythritol diphosphite, bis(2,6-di-tert-butyl-4-methylphenyl)pentaerythritol diphosphite, tris{4,4'-isopropylidenebis(2-tert-butylphenol)} phosphite, phenyldiisodecyl phosphite, di(nonylphenyl)pentaerythritol diphosphite, tris(1,3-di-stearoyloxyisopropyl) phosphite, 4,4'-isopropylidenebis(2-tert-butylphenol)-di(nonylphenyl) phosphite, 9,10-dihydro-9-oxa-1-phosphaphenanthrene-10-oxide and tetrakis(2,4-di-tert-butylphenyl)-4,4'-biphenylene diphosphite.

Examples of further employable antioxidants are 6-hydroxychroman derivatives, such as α-, β-, γ -and δ-tocopherol and mixtures thereof, 2,5-dimethyl-, 2,5,8-trimethyl- and 2,5,7,8-tetramethyl-substituted derivatives of 2-(4-methyl-penta-3-enyl)-6-hydroxychroman, 2,2,7-trimethyl-5-tert-butyl-6-hydroxychroman, 2,2,5-trimethyl-7-tert-butyl-6-hydroxychroman, 2,2,5-trimethyl-6-tert-butyl-6-hydroxchroman and 2,2-dimethyl-5-tert-butyl-6-hydroxychroman.

As the hydrochloric acid absorbers, there can be employed mixed salts represented by the formula MxAly(OH)2x+3y−2z(A)z.aH$_2$O (wherein M is Mg, Ca or Zn; A is an anion other than hydroxyl group; x, y and z are each a positive number; and a is 0 or a positive number, such as $Mg_6Al_2(OH)_{16}CO_3.4H_2O$, $MgAl_2(OH)_{20}CO_3.5H_2O$,
$Mg_5Al_2(OH)_{14}CO_3.4H_2O$,
$Mg_{10}Al_2(OH)_{22}(CO_3)_2.4H_2O$,
$Mg_6Al_2(OH)_{16}HPO_4.4H_2O$,
$Ca6Al_2(O)_{16}CO_3.4H_2O$,
$Zn_6Al_2(OH)_{16}CO_3.4H_2O$,
$Zn_6Al_2(OH)_{16}SO_4.4H_2O$,
$Mg_6Al_2(OH)_{16}SO_3.4H_2O$ and
$Mg_6Al_2(OH)_{12}CO_3.3H_2O$.

Examples of the light stabilizers include hydroxybenzophenones, such as 2-hydroxy-4-methoxybenzophenone, 2-hydroxy-4-n-octoxybenzophenone, 2,2'-dihydroxy-4-methoxybenzophenone and 2,4-dihydroxybenzophenone; benzotriazoles, such as 2-(2'-hydroxy-3'-tert-butyl-5'-methylphenyl)-5-chlorobenzotriazole, 2-(2'-hydroxy-3',5'-di-tert-butylphenyl) -5-chlorobenzotriazole, 2-(2'-hydroxy-5'-methylphenyl)benzotriazole and 2-(2'-hydroxy-3',5'-di-tert-amylphenyl)benzotriazole; benzoates, such as phenyl salicylate, p-tert-butylphenyl salicylate, 2,4-di-tert-butylphenyl-3,5-di-tert-butyl-4-hydroxybenzoate and hexadecyl-3,5-di-tert-butyl-4-hydroxybenzoate; nickel compounds, such as 2,2'-thiobis(4-tert-octylphenol) Ni salt, [2,2'-thiobis(4-tert-octylphenolate)]-n-butylamine Ni and (3,5-di-tert-butyl-4-hydroxybenzyl)phosphonic acid monoethyl ester Ni salt; substituted acrylonitriles, such as methyl α-cyano-β-methyl-β-(p-methoxyphenyl)acrylate; oxalic acid dianilides, such as N'-2-ethylphenyl-N-ethoxyphenyloxamide and N-2-ethylphenyl-N'-2-ethoxyphenyloxamide; and hindered amine compounds, such as bis(2,2,6,6-tetramethyl-4-piperidine)sebacate, poly [{(6-(1,1,3,3-tetramethylbutyl)imino}-1,3,5-triazine-2,4-diyl{4-(2,2,6,6-tetramethylpiperidyl)imino}hexamethylene] and a condensate of 2-(4-hydroxy-2,2,6,6-tetramethyl-1-piperidyl)ethanol and dimethyl succinate.

Examples of the lubricants include aliphatic hydrocarbons, such as paraffin waxes, polyethylene waxes and polypropylene waxes; higher fatty acids, such as capric acid, lauric acid, myristic acid, palmitic acid, margaric acid, stearic acid, arachidic acid and behenic acid; metallic salts of these acids, such as lithium salt, calcium salt, sodium salt, magnesium salt and potassium salt; aliphatic alcohols, such as palmityl alcohol, cetyl alcohol and stearyl alcohol; aliphatic amides, such as capronamide, caprylamide, caprinamide, laurylamide, myristylamide, palmitylamide and stearylamide; esters of fatty acids and alcohols; and fluorine compounds, such as fluoroalkylcarboxylic acids or their metallic salts and fluoroalkylsulfonic acid metallic salts.

The above-mentioned additives may be contained in the polypropylene composition in amounts of 0.0001 to 10% by weight.

By the addition of these additives to the polypropylene composition of the invention, molded articles much more improved in, for example, balance between properties, durability, paintability, printability, mar or scuffing resistance and molding processability can be formed from the composition.

The polypropylene composition of the invention may contain nucleating agents, as described above.

There is no specific limitation on the nucleating agent used herein, and various nucleating agents conventionally known are employable. Of these nucleating agents, preferred are aromatic phosphoric ester salts and dibenzylidenesorbitols.

As the aromatic phosphoric acid ester salts, there can be used compounds represented by the following formula:

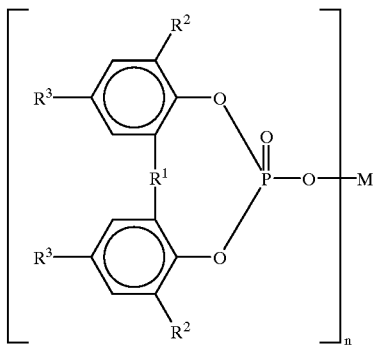

wherein $R^1$ is oxygen, sulfur or a hydrocarbon group of 1 to 10 carbon atoms; $R^2$ and $R^3$ may be the same or different and are each hydrogen or a hydrocarbon group of 1 to 10 carbon atoms; both $R^2$, both $R^3$, or $R^2$ and $R^3$ may be bonded together to form a ring; M is a monovalent to trivalent metal atom; and n is an integer of 1 to 3.

Examples of the nucleating agents represented by the above formula include sodium-2,2'-methylene-bis(4,6-di-t-butylphenyl)phosphate, sodium-2,2'-ethylidene-bis(4,6-di-t-butylphenyl)phosphate, lithium-2,2'-methylene-bis(4,6-di-t-butylphenyl)phosphate, lithium-2,2'-ethylidene-bis(4,6-di-t-butylphenyl)phosphate, sodium-2,2'-ethylidene-bis(4-i-propyl-6-t-butylphenyl)phosphate, lithium-2,2'-methylene-bis(4-methyl-6-t-butylphenyl)phosphate, lithium-2,2'-methylene-bis(4-ethyl-6-t-butylphenyl)phosphate, calcium-bis[2,2'-thiobis(4-methyl-6-t-butylphenyl)phosphate], calcium-bis[2,2'-thiobis(4-ethyl-6-t-butylphenyl) phosphate], calcium-bis[2,2'-thiobis(4,6-di-t-butylphenyl) phosphate], magnesium-bis[2,2'-thiobis(4,6-di-t-butylphenyl)phosphate], magnesium-bis[2,2'-thiobis(4-t-octylphenyl)phosphate], sodium-2,2'-butylidene-bis(4,6-dimethylphenyl)phosphate, sodium-2,2'-butylidene-bis(4,6-di-t-butylphenyl)phosphate, sodium-2,2'-t-octylmethylene-bis(4,6-dimethylphenyl)phosphate, sodium-2,2'-t-octylmethylere-bis(4,6-di-t-butylphenyl)phosphate, calcium-bis[2,2'-methylene-bis(4,6-di-t-butylphenyl) phosphate], magnesium-bis[2,2'-methylene-bis(4,6-di-t-butylphenyl)phosphate], barium-bis[2,2'-methylene-bis(4,6-di-t-butylphenyl)phosphate], sodium-2,2'-methylene-bis(4-methyl-6-t-butylphenyl)phosphate, sodium-2,2'-methylene-bis(4-ethyl-6-t-butylphenyl)phosphate, sodium(4,4'-dimethyl-5,6'-di-t-butyl-2,2'-biphenyl)phosphate, calcium-bis[(4,4'-dimethyl-6,6'-di-t-butyl-2,2'-biphenyl)phosphate], sodium-2,2'-ethylidene-bis(4-m-butyl-6-t-butylphenyl) phosphate, sodium-2,2'-methylene-bis(4,6-dimethylphenyl) phosphate, sodium-2,2'-methylene-bis(4,6-diethylphenyl) phosphate, potassium-2,2'-ethylidene-bis(4,6-di-t-butylphenyl)phosphate, calcium-bis[2,2'-ethylidene-bis(4,6-di-t-butylphenyl)phosphate], magnesium-bis[2,2'-ethylidene-bis(4,6-di-t-butylphenyl)phosphate], barium-bis[2,2'-ethylidene-bis(4,6-di-t-butylphenyl)phosphate], aluminum-tris[2,2'-methylene-bis(4,6-di-t-butylphenyl) phosphate] and aluminum-tris[2,2'-ethylidene-bis(4,6-di-t-butylphenyl)phosphate], and mixtures of these compounds. Of these, sodium-2,2'-methylene-bis(4,6-di-t-butylphenyl) phosphate is preferred.

As the nucleating agents, the following aromatic phosphoric ester salts can also be used:

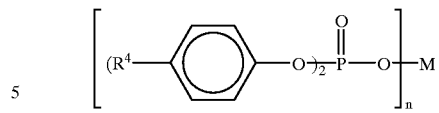

wherein $R^4$ is hydrogen or a hydrocarbon group of 1 to 10 carbon atoms; M is a monovalent to trivalent metal atom; and n is an integer of 1 to 3.

Examples of these compounds include sodium-bis(4-t-butylphenyl)phosphate, sodium-bis(4-methylphenyl) phosphate, sodium-bis(4-ethylphenyl)phosphate, sodium-bis(4-i-propylphenyl)phosphate, sodium-bis(4-t-octylphenyl)phosphate, potassium-bis(4-t-butylphenyl) phosphate, calcium-bis(4-t-butylphenyl)phosphate, magnesium-bis(4-t-butylphenyl)phosphate, lithium-bis(4-t-butylphenyl)phosphate and aluminum-bis(4-t-butylphenyl) phosphate, and mixtures of these compounds. Of these, sodium-bis(4-t-butylphenyl)phosphate is preferred.

Further, as the nucleating agent, there can also be used benzylidenesorbitols represented by the formula:

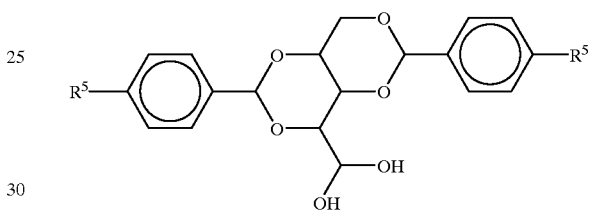

wherein $R^5$ is hydrogen or a hydrocarbon group of 1 to 10 carbon atoms.

Examples of these compounds include 1,3,2,4-dibenzylidenesorbitol, 1,3-benzylidene-2,4-p-methylbenzylidenesorbitol, 1,3-benzylidene-2,4-p-ethylbenzylidenesorbitol, 1,3-p-methylbenzylidene-2,4-benzylidenesorbitol, 1,3-p-ethylbenzylidene-2,4-benzylidenesorbitol, 1,3-p-methylbenzylidene-2,4-p-ethylbenzylidenesorbitol, 1,3-p-ethylbenzylidene-2,4-p-methylbenzylidenesorbitol, 1,3,2,4-di(p-methylbenzylidene)sorbitol, 1,3,2,4-di(p-ethylbenzylidene) sorbitol, 1,3,2,4-di(p-n-propylbenzylidene)sorbitol, 1,3,2,4-di(p-i-propylbenzylidene)sorbitol, 1,3,2,4-di(p-n-butylbenzylidene)sorbitol, 1,3,2,4-di(p-s-butylbenzylidene) sorbitol, 1,3,2,4-di(p-t-butylbenzylidene)sorbitol, 1,3,2,4-di (2',4'-dimethylbenzylidene)sorbitol, 1,3,2,4-di(p-methoxybenzylidene)sorbitol, 1,3,2,4-di(p-ethoxybenzylidene)sorbitol, 1,3-benzylidene-2,4-p-chlorobenzylidenesorbitol, 1,3-p-chlorobenzylidene-2,4-benzylidenesorbitol, 1,3-p-chlorobenzylidene-2,4-p-methylbenzylidenesorbitol, 1,3-p-chlorobenzylidene-2,4-p-ethylbenzylidenesorbitol, 1,3-p-methylbenzylidene-2,4-p-chlorobenzylidenesorbitol, 1,3-p-ethylbenzylidene-2,4-p-chlorobenzylidenesorbitol and 1,3,2,4-di(p-chlorobenzylidene)sorbitol, and mixtures of these compounds. Of these, 1,3,2,4-dibenzylidenesorbitol, 1,3,2, 4-di(p-methylbenzylidene)sorbitol, 1,3,2,4-di(p-ethylbenzylidene)sorbitol, 1,3-p-chlorobenzylidene-2,4-p-methylbenzylidenesorbitol, 1,3,2,4-di(p-chlorobenzylidene) sorbitol and mixtures thereof are preferred.

Further, nucleating agents which may be used are metallic salts of aromatic carboxylic acids and aliphatic carboxylic acids. Examples thereof include aluminum benzoate, aluminum p-t-butylbenzoate, sodium adipate, sodium thiophenecarboxylate and sodium pyrrolecarboxylate.

Inorganic compounds such as talc are also employable as the nucleating agents.

The nucleating agent as described above may be contained in the polypropylene composition of the invention in an amount of 0.001 to 10% by weight, preferably 0.01 to 5% by weight, more preferably 0.1 to 3% by weight.

By the addition of the nucleating agent, the crystallization rate of the polypropylene composition can be improved and the crystal particles can be made smaller in the crystallization process, whereby high-speed molding can be attained.

As the other resins which may be added to the composition of the invention, thermoplastic resins or thermosetting resins are employable. Examples of such resins include α-olefin homopolymers such as polyethylene and poly-1-butene, α-olefin copolymers, copolymers of α-olefins and vinyl monomers, modified olefin polymers such as maleic anhydride-modified polypropylenes, polyamides, polycarbonates, ABS resins, polystyrenes, polyvinyl chlorides, polyphenylene oxides, petroleum resins and phenolic resins.

The polypropylene composition of the invention may further contain inorganic fillers. Examples of the inorganic fillers include:

powdery fillers, for example, natural silicic acids or silicates such as fine-powdery talc, kaolinite, calcined clay, pyrophyllite, sericite and wollastonite, carbonates such as precipitated calcium carbonate, ground limestone and magnesium carbonate, hydroxides such as aluminum hydroxide and magnesium hydroxide, oxides such as zinc oxide, zinc white and magnesium oxide, and synthetic silicic acids or silicates such as hydrated calcium silicate, hydrated aluminum silicate, hydrated silicic acid and silicic anhydride;

flaky fillers, such as mica;

fibrous fillers, such as basic magnesium sulfate whisker, calcium titanate whisker, aluminum borate whisker, sepiolite, PMF (Processed Mineral Fiber), xonotolite, potassium titanate and ellestadite; and balloon fillers, such as glass balloon and fly ash balloon.

Of these fillers, fine-powdery talc is preferably used in the invention. Particularly preferred is fine-powdery talc having a mean particle diameter of 0.2 to 3 μm, especially 0.2 to 2.5 μm.

The talc desirably contains particles having a mean diameter of not less than 5 μm in an amount of not more than 10% by weight, preferably not more than 8% by weight.

The mean particle diameter of the talc can be measured by a liquid phase precipitation method.

In the present invention, it is preferable that the talc has a mean aspect ratio (ratio of longitudinal or lateral length to thickness) of not less than 3, particularly not less than 4.

The inorganic fillers, in particular talc may be used with or without surface treatment in the invention. The surface treatment can be carried out chemically and physically, for example, using treating agents such as silane coupling agents, higher fatty acids, fatty acid metallic salts, unsaturated organic acids, organic titanates, resin acids and polyethylene glycols.

By the use of the surface-treated inorganic fillers such as talc, a polypropylene composition excellent also in weld strength, paintability and molding processability can be obtained.

The inorganic fillers as mentioned above may be used in combination.

If necessary, organic fillers such as high styrenes, lignin and reclaimed rubbers may be used in combination with the inorganic fillers.

The polypropylene composition of the invention described above is excellent in heat resistance and low-temperature heat-sealing properties as well as in flexibility and impact resistance. The polypropylene composition can be favorably used for heat-sealable OPP, injection molded articles, e.g., container, improved in impact resistance, stretch-blow molded articles, containers for retort pouch foods, films and sheets.

Further, the polypropylene composition of the invention can be applied to other various uses than the above-mentioned ones. For example, it can be used for household appliance parts such as housings and tubs of washing machines, automobile interior parts such as trims, interior panels and column covers, automobile exterior parts such as fenders, bumpers, side moles, mudguards and mirror covers, and ordinary miscellaneous goods.

Next, the polypropylene composite film of the invention comprising a layer of the above-mentioned polypropylene composition is described in detail.

Polypropylene Composite Film

The polypropylene composite film according to the invention comprises:

(I) a crystalline polypropylene layer, and (II) a layer formed from the polypropylene composition of the present invention, which is laminated on at least one surface of the crystalline polypropylene layer (I).

(I) Crystalline Polyprooylene Layer

The substrate of the polypropylene composite film of the invention is formed from a crystalline polypropylene (I).

In the present invention, as the crystalline polypropylene, polypropylenes conventionally known as film-forming materials can be used, but preferably used is a polypropylene having an isotactic index I.I. (boiling n-heptane-insoluble component) of not less than 75%, preferably 75 to 99%.

The crystalline polypropylene preferably has a density of 0.89 to 0.92 g/cm$^3$ and a melt index (230° C.) of 0.1 to 10 g/10 min.

Although a homopolypropylene is generally used as the crystalline polypropylene, a propylene random copolymer containing units from an olefin other than propylene in a small amount, e.g., not more than 5% by mol, may be used as long as the objects of the invention are not marred. Examples of the other olefins include α-olefins of 2 to 20 carbon atoms except propylene, such as ethylene, 1-butene, 1-pentene, 1-hexene, 1-heptene, 1-octene, 1-decene, 1-dodecene, 1-hexadecene and 4-methyl-1-pentene.

The crystalline polypropylene used in the invention can be prepared by a conventional process using a known solid titanium catalyst component or metallocene compound catalyst component.

To the crystalline polypropylene, additives such as heat stabilizers, ultraviolet light absorbers, anti-blocking agents, slip agents and antioxidants may be added.

In the invention, the crystalline polypropylene layer (I) may be either unstretched or biaxially stretched.

(II) Polypropylene Composition Layer

The heat-sealing layer of the polypropylene composite film is formed from the polypropylene composition of the invention described above.

Among the polypropylene compositions, particularly preferably used to form the heat-sealing layer of the polypropylene composite film is a composition comprising (A) a polypropylene and (B) a propylene-1-butene random copolymer, both described below.

The polypropylene (A) is preferably a crystalline polypropylene containing units from propylene in an amount of not less than 90% by mol.

The propylene-1-butene random copolymer (B) desirably have the following properties:

(1) The copolymer contains units from propylene in an amount of 50 to 95% by mol, preferably 55 to 93% by mol, more preferably 60 to 90% by mol, and contains units from 1-butene in an amount of 5 to 50% by mol, preferably 7 to 45% by mol, more preferably 10 to 40% by mol.

(2) The intrinsic viscosity ($\eta$) is in the range of 0.1 to 5 dl/g, preferably 0.5 to 4 dl/g, more preferably 1 to 3 dl/g.

(3) The molecular weight distribution (Mn/Mw) is not more than 3, preferably not more than 2.5.

(4) The randomness parameter B value is in the range of 1.0 to 1.5, preferably 1.0 to 1.3, more preferably 1.0 to 1.2.

(5) The melting point Tm, as measured by a differential scanning calorimeter, is in the range of 60 to 140° C., preferably 80 to 120° C., more preferably 90 to 110° C.

(6) The crystallinity, as measured by X-ray diffractometry, is preferably in the range of 15 to 65%, more preferably 20 to 60%.

Further, the propylene-1-butene random copolymer may contain regio-irregular units based on 2,1-insertions of propylene in an amount of not less than 0.05 %.

The polypropylene composition for forming the heat-sealing layer of the polypropylene composite film of the invention contains the propylene-1-butene random copolymer (B) having the above properties, so that it exhibits excellent heat-sealing properties. For example, if the intrinsic viscosity ($\eta$), i.e., the above property (2) of the propylene-1-butene copolymer, exceeds 5 dl/g, the moldability of the composition may be reduced and thus it may be difficult to form a heat-sealing layer having a desired thickness, e.g., not more than 50 $\mu$m. If the intrinsic viscosity ($\eta$) is less than 0.1 dl/g, the heat-sealing strength may be lowered.

If the melting point, i.e., the above property (5), exceeds 140° C., heat-sealing may require high temperatures, e.g., not lower than 130° C. If the melting point is lower than 60° C., the low-temperature heat-sealing properties are improved, but the scratch resistance may be lowered and blocking of the resulting films may take place during storage, making their practical use hard.

A propylene-1-butene random copolymer having a crystallinity of 15 to 65% is preferred because a film of excellent low-temperature heat-sealing properties and high blocking resistance can be obtained. If the crystallinity is less than 15%, the resulting film may have insufficient scratch resistance and tends to suffer blocking and tackiness. If the crystallinity is more than 65%, the low-temperature heat-sealing properties are not sufficiently improved.

In the present invention, the propylene-1-butene random copolymer which is partially or fully modified with unsaturated carboxylic acids or anhydrides thereof can also be used. The modified product of the propylene-1-butene random copolymer is excellent in overwrapping properties and bond properties to other materials such as metals.

In the polypropylene composite film of the invention, the heat-sealing layer (II) is formed from a polypropylene composition comprising the polypropylene (A) and the propylene-1-butene random copolymer (B), and the amounts of these components (A) and (B) can be properly determined depending on the purposes.

In the invention, for example, the heat-sealing layer (II) of the polypropylene composite film may be formed from a polypropylene composition which contains the polypropylene (A) in an amount of 5 to 50% by weight and the propylene-1-butene random copolymer in an amount of 95 to 50% by weight.

From the polypropylene composition containing the components (A) and (B) in the above-mentioned amounts, there can be obtained a polypropylene composite film (1) excellent in not only transparency, low-temperature heat-sealing properties and hot tack properties but also slip properties and mechanical strength such as blocking resistance and scratch resistance.

The heat-sealing layer (II) of the polypropylene composite film of the invention may also be formed from a polypropylene composition which contains the polypropylene (A) in an amount of not less than 50% by weight and less than 90% by weight and the propylene-1-butene random copolymer (B) in an amount of not less than 10% by weight and less than 50% by weight.

From the polypropylene composition containing the components (A) and (B) in the above-mentioned amounts, there can be obtained a polypropylene composition film (2) excellent in not only transparency and low-temperature heat-sealing properties but also mechanical strength such as blocking resistance and scratch resistance.

In the polypropylene composite films according to the invention, if the amount of the crystalline polypropylene (A) in the polypropylene composition exceeds 90% by weight, the softening temperature of the film strikingly rises and the low-temperature heat-sealing properties are markedly lowered. If the amount thereof is less than 5% by weight, the blocking resistance and the scratch resistance of the film may be lowered.

The polypropylene composite film according to the invention comprises the crystalline polypropylene layer (I) and the polypropylene composition heat-sealing layer (II), and the heat-sealing layer (II) may be provided on one or both surfaces of the crystalline polypropylene layer (I) serving as a substrate.

In the polypropylene composite film of the invention, the crystalline polypropylene layer (I), as a substrate may be either unstretched, monoaxially or biaxially stretched. One or both surfaces of the substrate (I) may be subjected to corona discharge treatment by a conventional method.

The composite film of the invention can be obtained from the crystalline polypropylene (I) and the polypropylene composition (II) by, for example, the following processes.

(1) The crystalline polypropylene (I) and the polypropylene composition (II) are co-extruded to form a laminated sheet.

This laminated sheet may be monoaxially stretched in the longitudinal or lateral direction, or may be biaxially stretched in the longitudinal and lateral directions separately or simultaneously.

(2) The crystalline polypropylene (I) is melt-extruded to form a film (substrate), on which the polypropylene composition (II) is melt-extruded to form a laminated sheet.

This laminated sheet may be monoaxially stretched in the longitudinal or lateral direction, or may be biaxially stretched in the longitudinal and lateral directions separately or simultaneously.

(3) The crystalline polypropylene (I) is melt-extruded and monoaxially stretched in the longitudinal or lateral direction to form a substrate. On the monoaxially stretched substrate, the polypropylene composition (II) is melt-extruded, or a film of the polypropylene composition (II) preliminarily formed is laminated. The resulting laminated sheet is stretched in the unstretched direction of the substrate.

(4) The crystalline polypropylene (I) is melt-extruded and biaxially stretched in the longitudinal and lateral directions separately or simultaneously to form a substrate. On the biaxially stretched substrate, the polypropylene composition (II) is melt-extruded, or a film of the polypropylene composition (II) preliminarily formed is laminated.

(5) A film of the crystalline polypropylene (I) and a film of the polypropylene composition (II) are laminated together with an adhesive. The resulting laminated sheet may be monoaxially stretched in the longitudinal or lateral direction, or may be biaxially stretched in the longitudinal and lateral directions separately or simultaneously.

In the polypropylene composite film according to the invention, the layer of crystalline polypropylene (I) has a thickness of 5 to 200 μm, preferably 10 to 60 μm, and the layer of polypropylene composition (II) has a thickness of 0.1 to 50 μm, preferably 0.5 to 20 μm.

In the composite film of the invention, when the substrate made of the crystalline polypropylene (I) is stretched, the stretch ratio in the longitudinal direction is in the range of 3 to 7 times, preferably 4 to 6 times, and the stretch ratio in the lateral direction is in the range of 3 to 12 times, preferably 6 to 10 times.

EFFECT OF THE INVENTION

The polypropylene composition according to the invention is excellent in heat resistance and low-temperature heat-sealing properties as well as in flexibility and impact resistance. The polypropylene composition can be favorably used for heat-sealable OPP, injection molded articles such as containers improved in impact resistance, stretch-blow molded articles, containers for retort pouch foods, films and sheets.

Further, the polypropylene composition of the invention can be applied to other various uses than the above-mentioned ones. For example, it can be used for household appliance parts such as housings and tubs of washing machines, automobile interior parts such as trims, interior panels and column covers, automobile exterior parts such as fenders, bumpers, side moles, mudguards and mirror covers, and ordinary miscellaneous goods.

The polypropylene composite film of the invention having a heat-sealing layer of the polypropylene composition is excellent in heat-sealing properties. Particularly, the film can be heat-sealed in a wide temperature range, in particular at low temperatures, and has high heat-sealing strength. Further, even when the polypropylene composite film is stored for a long period of time, its heat-sealing temperature does not change with time, and thus stable heat-sealing operation can be assured.

Furthermore, because of its excellent transparency, scratch resistance and blocking resistance, the polypropylene composite film of the invention can be used for high-speed packaging.

According to the invention, a polypropylene composite film further having good hot tack properties in addition to the above-mentioned excellent properties can be formed.

The polypropylene composite film according to the invention can be favorably used for packaging of foods, fill-packaging and fiber packaging.

EXAMPLE

The present invention will be further described with reference to the following examples, but it should be construed that the invention is in no way limited to those examples.

Measurement of Properties of the Propylene-1-Butene Random Copolymer (B)

(1) Propylene Content and 1-Butene Content: Determined using $^{13}$C-NMR.

(2) Intrinsic Viscosity (η):

Measured in decahydronaphthalene at 135° C. and expressed by dl/g.

(3) Molecular Weight Distribution (Mw/Mn):

Measured in the following manner using GPC-150C produced by Millipore Co.

A separatory column of TSK-GNH-HT having a diameter of 27 mm and a length of 600 mm was used, and the column temperature was set to 140° C. A mobile phase used was o-dichlorobenzene (available from Wako Junyaku Kogyo K.K.) containing 0.025% by weight of BHT (available from Takeda Chemical Industries, Ltd.) as an antioxidant and a moving rate was 1.0 ml/min. 500 μl of a solution containing 0.1% by weight of a sample was introduced into the column. A differential refractometer was used as a detector.

With regard to molecular weight standards, polystyrenes available from Toso Co., Ltd. were used for Mw<1,000 and Mw>4×10$^6$, and polystyrenes available from Pressure Chemical Co. were used for 1,000<Mw<4×10$^6$.

(4) B Value (monomer distribution)

A homogeneous sample solution of about 200 mg of a copolymer in 1 ml of hexachlorobutadiene was measured for its $^{13}$C NMR spectrucm in a sample tube having a diameter of 10 mm under the measuring conditions of usually a temperature of 120° C., a frequency of 25.05 MHz, a spectral width of 1,500 Hz, a filter width of 1,500 Hz, pulse repetition time of 4.2 sec and integrating times of 2,000 to 5,000. From the spectrum obtained, $P_E$, $P_O$ and $P_{OE}$ were sought, and the B value was calculated using $P_E$, $P_O$ and $P_{OE}$.

(5) Melting Point (Tm):

Measured in the following manner using a DSC-7 type measuring device produced by Perkin Elmer Co. About 5 mg of a sample charged in an aluminum pan was heated to 200° C., kept at 200° C. for 5 minutes, then cooled to −40° C. at a rate of 10° C./min and heated again at a rate of 10° C./min, to obtain an endothermic curve of the sample. From the endothermic curve, the melting point (Tm) was determined.

(6) Crystallinity:

Determined by X-ray diffractometry for a press sheet having a thickness of 1.0 mm which was stored for at least 24 hours after the press molding.

(7) Triad Tacticity

A $^{13}$C-NMR spectrum (tetramethylsilane standard) of a hexachlorobutadiene solution of a sample was measured, and a proportion (%) of the area of peaks appeared in the region of 21,0 to 21.0 ppm to the total area (100%) of peaks appeared in the region of 19.5 to 21.9 ppm was calculated.

(8) Proportion of Hetero Bonds Based on 2,1-insertions:

Determined in the aforesaid manner using a $^{13}$C-NMR spectrum with reference to "Polymer", 30, 1350 (1989).

Polypropylenes and propylene-1-butene random copolymers used in Examples 1 to 6 and Comparative Examples 1 and 2 are described below.

In the examples and comparative examples, the following polypropylenes prepared using a general-purpose solid titanium catalyst component were used.

Polypropylene-1: a propylene homopolymer (intrinsic viscosity (η): 2.9 dl/g, DSC melting point: 164° C., crystallinity: 62%).

Polypropylene-2: a propylene random copolymer (composition: propylene=96.4% by mol, ethylene=2.1% by mol, 1-butene=1.5% by mol, intrinsic viscosity (η): 2.1 dl/g, DSC melting point: 142° C., crystallinity: 56%).

Next, a synthesis example for synthesizing a catalyst component, and preparation examples for preparing the propylene-1-butene random copolymers (B) using a catalyst component synthesized by the same procedure as in the synthesis example are described. The properties of the propylene-1-butene random copolymers (PBR) obtained in the preparation examples are set forth in Table 2.

Synthesis Example 1
Synthesis of rac-dimethylsilylene-bis{1-(2-ethyl-4-phenylindenyl)}zirconium dichloride
Synthesis of 3-(2-biphenylyl)-2-ethylpropionic acid:

To a 500-ml four-necked round flask (equipped with a stirrer, a Dimroth condenser, a dropping funnel and a thermometer) were introduced 13.46 g (120 mmol) of potassium t-butoxide, 100 ml of toluene and 20 ml of N-methylpyrrolidone, and then, in a nitrogen atmosphere, a solution of 20.7 g (110 mmol) of diethyl ethylmalonate in 50 ml of toluene was dropwise added with heating to 60° C. After the dropwise addition was completed, the mixture was reacted for 1 hour at the same temperature, and then, at the same temperature, a solution of 20.27 g (100 mmol) of 2-phenylbenzyl bromide in 30 ml of toluene was dropwise added. After the dropwise addition was completed, the mixture was heated and refluxed for 2 hours. The reaction mixture was poured into 200 ml of water, and 2N-HCl was added to adjust pH of the mixture to 1. The organic phase was separated, and the aqueous phase was extracted three times with 100 ml of toluene. The combined organic phases were washed with a saturated saline solution until the organic phases became neutral, followed by drying over anhydrous $Na_2SO_4$. The solvent was removed under reduced pressure to obtain 36.7 g of an yellow orange liquid concentrate.

To a 1-liter four-necked round flask (equipped with a stirrer, a Dimroth condenser, a dropping funnel and a thermometer) were introduced 67.3 (1.02 mol) of potassium hydroxide and 160 ml of a methanol aqueous solution (methanol/water=4/1 (v/v)), and then, in a nitrogen atmosphere at room temperature, a solution of the concentrate obtained above in 50 ml of a methanol aqueous solution (methanol/water=4/1 (v/v)) was dropwise added. After the dropwise addition was completed, the mixture was heated and refluxed for 4 hours, and then cooled to room temperature, and the solid precipitated was filtered. The solid was dissolved in water, and sulfuric acid was added to the solution until it became acidic (pH=1). The solution was extracted five times with 100 ml of methylene chloride. The combined organic phases were dried over anhydrous $Na_2SO_4$, and then, the solvent was removed under reduced pressure to obtain 24.2 g of a white solid product.

Subsequently, to a 300-ml three-necked round flask (equipped with a stirrer tip, a Dimroth condenser and a thermometer) were introduced 24.2 g of the white solid obtained above, 56 ml of acetic acid, 37 ml of water and 13.1 ml of concentrated sulfuric acid, and they were refluxed for 6 hours in a nitrogen atmosphere. After the reaction was completed, the acetic acid was distilled off under reduced pressure, 50 ml of water was added, and the mixture was extracted three times with 50 ml of methylene chloride. The combined organic phases were washed with 50 ml of a saturated saline solution and dried over anhydrous $Na_2SO_4$. Then, the solvent was distilled off under reduced pressure, and the residue was purified by silica gel chromatography using a gradient of hexane/ethyl acetate (2/1→1/1, by volume) to obtain 13.7 g of a white solid (yield: 54%). The properties of the product thus obtained are described below.

FD-MS: 254 (M+)
mp.: 91.2–94.0° C.
NMR ($CDCl_3$, 90 Hz): δ=0.71 (t, J=7.2 Hz, 3H, $CH_3$); 1.16–1.58 (m, 2H); 2.32 (bquin, J=7.0 Hz, 1H, >CH—); 2.61–2.99 (m, 2H); 6.89–7.47 (m, 9H).
IR (KBr disk): 1696 $cm^{-1}$ ($V_{c=o}$)

Synthesis of 3-(2-biphenylyl)-2-ethylpropionyl chloride:

To a 100-ml three-necked round flask (equipped with a stirrer tip, a Dimroth condenser, a thermometer and a trap of NaOH) were introduced 13.3 g (52.4 mmol) of 3-(2-biphenylyl)-2-ethylpropionic acid and 25.9 ml (355 mmol) of thionyl chloride, and they were refluxed for 2.5 hours with heating in a nitrogen atmosphere. After the reaction was completed, the unreacted thionyl chloride was distilled off under reduced pressure to obtain 15.2 g of a crude product as a yellow orange liquid. This acid chloride was used for the next reaction without further purification. The properties of the product thus obtained are described below.

IR (Neat): 1786 $cm^{-1}$ ($V_{c=o}$)

Synthesis of 4-ethyl-2-phenyl-1-indanone:

To a 200-ml three-necked round flask (equipped with a stirrer tip, a Dimroth condenser, a dropping funnel, a thermometer and a trap of NaOH) were introduced 8.04 g (60.3 mmol) of anhydrous aluminum chloride and 50 ml of carbon disulfide, and then, in a nitrogen atmosphere under ice cooling, a solution of 15.2 g (52.4 mmol) of 3-(2-biphenylyl)-2-ethylpropionyl chloride obtained above in 21 ml of carbon disulfide was dropwise added. After the dropwise addition was completed, the internal temperature was elevated to room temperature to perform reaction for 1 hour. Then, the reaction solution was poured into 200 ml of ice water to decompose the unreacted aluminum chloride and extracted twice with 100 ml of ether. The combined organic phases were washed with 100 ml of a saturated $NaHCO_3$ aqueous solution and then with 100 ml of a saturated saline solution, followed by drying over anhydrous $Na_2SO_4$. The solvent was distilled off under reduced pressure, and the residue was purified by silica gel chromatography using hexane/ethyl acetate (10/1, by volume) to obtain 10.8 g of the aimed product as a yellow solid (yield: 88%). The properties of the product thus obtained are described below.

NMR ($CDCl_3$, 90 Hz): δ=0.98 (t, J=7.2 Hz, 3H, $CH_3$); 1.60–2.20 (m, 2H); 2.42–2.82 (m, 1H, >CH-); 2.80(dd, J=3.8 Hz, 16.5 Hz, 1H); 3.36 (dd, J=7.6 Hz, 16.5 Hz, 1H); 7.09–7.91 (m, 8H).
IR (Neat): 1705 $cm^{-1}$ ($V_{c=o}$).

Synthesis of 2-ethyl-1-hydroxy-4-phenylindan:

To a 200-ml three-necked round flask (equipped with a stirrer tip, a Dimroth condenser, a dropping funnel and a thermometer) were introduced 0.85 g (22.6 mmol) of sodium boron hydride and 28 ml of ethanol, and then in a nitrogen atmosphere at room temperature, a solution of 10.6 g (45.1 mmol) of 2-ethyl-4-phenyl-1-indanone in 20 ml of ethanol was dropwise added. After the dropwise addition was completed, the temperature was elevated to 50° C. to perform reaction for further 3.5 hours. After the reaction, the mixture was cooled, and acetone was dropwise added to decompose the unreacted sodium boron hydride. Then, the reaction mixture was concentrated under reduced pressure and extracted with 50 ml of water and 50 ml of ether. The organic phase was separated, and the aqueous phase was extracted twice with 50 ml of ether. The combined organic phases were washed with 100 ml of a saturated saline solution and dried over anhydrous $Na_2SO_4$. Then, the solvent was distilled off under reduced pressure to obtain 10.67 g of the aimed product (a mixture of two isomers) as a viscous, light yellow liquid (yield: 99%). The properties of the product thus obtained are described below.

NMR ($CDC_3$, 90 Hz): δ=1.02 (t, J=7.1 Hz, 3H, $CH_3$); 1.31–3.28 (m, 2H); 4.86, 5.03 (each d, each J=6.4 Hz, J=5.1 Hz, together 1H, >CH—O—); 7.10–7.66 (m, 8H).
IR (Neat): 3340 $cm^{-1}$ ($V_{OH}$).

Synthesis of 2-ethyl-4-phenylindene:

To a 300-ml four-necked round flask (equipped with a stirrer tip, a dropping funnel and a thermometer) were introduced 9.78 g (41.3 mmol) of 2-ethyl-1-hydroxy-4-phenylindan, 17.2 ml (123.8 mmol) of triethylamine, 0.25 g (2.1 mmol) of 4-dimethylaminopyridine and 98 ml of methylene chloride, and then in a nitrogen atmosphere under ice cooling, a solution of 6.4 ml (82.5 mmol) of methanesulfonyl chloride in 6.5 ml of methylene chloride was dropwise added slowly. After the dropwise addition was completed, the reaction was performed for further 3.5 hours at the same temperature. The reaction mixture was poured into 250 ml of ice water, the organic phase was separated, and the aqueous phase was extracted twice with 50 ml of methylene chloride. The combined organic phases were washed with a saturated $NaHCO_3$ aqueous solution and then with a saturated saline solution, followed by drying over anhydrous $Na_2SO_4$. The solvent was distilled off under reduced pressure, and the residue was purified by silica gel chromatography using hexane to obtain 6.56 g of the aimed product (a mixture of isomers) as a light yellow liquid (yield: 73%). The properties of the product thus obtained are described below.

NMR ($CDCl_3$, 90 MHz): δ=1.20 (t, J=7.6 Hz, 3H, $CH_3$); 2.49 (q, J=7.6 Hz, 2H); 3.41 (s, 2H); 6.61, 6.72 (each bs, together 1H); 7.09–8.01 (m, 8H).

Synthesis of dimethylsilylene-bis(2-ethyl-4-phenylindene:

To a 200-ml three-necked round flask (equipped with a stirrer tip, a Dimroth condenser, a dropping funnel and a thermometer) were introduced 5.0 g (22.8 mmol) of 2-ethyl-4-phenylindene, 80 mg (0.63 mmol) of copper thiocyanate and 50 ml of anhydrous ether, and then in a nitrogen atmosphere under ice cooling, a solution of 15.7 ml (25.1 mmol) of n-butyllithium in hexane (concentration: 1.6 M) was dropwise added slowly. After the dropwise addition was completed, the temperature of the mixture was elevated to room temperature to perform reaction for further 1 hour. Then, a solution of 1.52 ml (12.6 mmol) of dimethyldichlorosilane in 4.5 ml of anhydrous ether was dropwise added slowly. After the dropwise addition was completed, the reaction was performed for further 12 hours at room temperature. The reaction mixture was filtered through Celite, and the filtrate was poured into 50 ml of a saturated ammonium chloride aqueous solution. The organic phase was separated, and the aqueous phase was extracted with 50 ml of ether. The combined organic phases were washed with a saturated saline solution and dried over anhydrous $Na_2SO_4$. The solvent was distilled off under reduced pressure, and the residue was separated by silica gel chromatography using a gradient of hexane to hexane/methylene chloride (20/1, by volume) to obtain 4.5 g of the aimed product (a mixture of two isomers) as a light yellow solid (yield: 80%). The properties of the product thus obtained are described below.

NMR ($CDCl_3$, 90 Hz): δ=−0.23, −0.17 (each s, together 6H, Si—$CH_3$); 1.12, 1.19 (each t, each J=7.4 Hz, together 6H, $CH_3$); 2.44 (bq, J=7.4 Hz, 4H); 3.81 (s, 2H, >CH—Si—); 6.75 (bs, 2H, 3-H-Ind); 6.88–7.74 (m, 16H). Synthesis of rac-dimethylsilylene-bis{1-(2-ethyl-4-phenylindenyl)}zirconium dichloride:

To a 50-ml three-necked round flask (equipped with a stirrer tip, a bead condenser, a dropping funnel and a thermometer) were introduced 0.84 g (1.69 mmol) of dimethylsilylene-bis(2-ethyl-4-phenylindene) and 17 ml of anhydrous ether, and then at room temperature, a solution of 2.25 ml (3.56 mmol) of n-butyllithium in hexane (concentration: 1.58 M) was dropwise added slowly. After the dropwise addition was completed, the reaction was performed for further 13.5 hours, the reaction solution was cooled to −70° C. in a dry ice/acetone bath, 0.395 g (1.69 mmol) of a $ZrCl_4$ powder was added in portions, and the resulting mixture was stirred overnight. Then, the solvent was distilled off at room temperature under reduced pressure, 30 ml of methylene chloride was added, and the insoluble matters were filtered off. The filtrate was concentrated at room temperature to precipitate a solid which was filtered, washed twice with 3 ml of anhydrous ether and dried under reduced pressure to obtain 0.17 g of the aimed product as an orange yellow solid (yield: 15%). The properties of the product thus obtained are described below.

NMR ($CDCl_3$, 90 MHz): δ=1.09 (t, J=7.3 Hz, 6H, $CH_3$); 1.34 (s, 6H, Si—$CH_3$); 2.46 (quin, J=7.3 Hz, 2H); 2.73 (quin, J=7.3 Hz, 2H); 6.96 (s, 2H, 3-H-Ind); 6.99–7.88 (m, 16H).

Preparation Example 3

Preparation of PBR-3

To a 2-liter autoclave thoroughly purged with nitrogen were introduced 900 ml of hexane and 90 g of 1-butene, followed by adding 1 mmol of triisobutylaluminum. After the temperature of the system was elevated to 70° C., propylene was fed so that the total pressure became 7 kg/cm²-G, and 0.30 mmol of methylaluminoxane and 0.001 mmol (in terms of Zr atom) of rac-dimethylsilylene-bis{1-(2-methyl-4-phenylindenyl)}zirconium dichloride prepared in a manner similar to the above synthesis example were further added. The polymerization was performed for 30 minutes while propylene was continuously fed to keep the total pressure at 7 kg/cm²-G. After the polymerization, the autoclave was released, and a polymer was recovered in a large amount of methanol and dried in vacuum at 110° C. for 12 hours.

The amount of the polymer (propylene-1-butene random copolymer) obtained was 39.7 g, and the polymerization activity was 79 kg-polymer/mmol-Zr·hr. This polymer had a 1-butene content of 26.4% by mol, an intrinsic viscosity (η) of 1.60 dl/g and a melting point of 88.4° C. The proportion of the hetero bonds based on the 2,1-insertions was about 0.02%. Other properties of the polymer are set forth in Table 2.

Preparation Example 2

Preparation of PBR-2

To a 2-liter autoclave thoroughly purged with nitrogen were introduced 900 ml of hexane and 60 g of 1-butene, followed by adding 1 mmol of triisobutylaluminum. After the temperature of the system was elevated to 70° C., propylene was fed so that the total pressure became 7 kg/cm²-G, and 0.30 mmol of methylaluminoxane and 0.001 mmol (in terms of Zr atom) of rac-dimethylsilylene-bis{1-(2-methyl-4-phenylindenyl)}zirconium dichloride prepared in a manner similar to the above synthesis example were further added. The polymerization was performed for 30 minutes while propylene was continuously fed to keep the total pressure at 7 kg/cm²-G. After the polymerization, the autoclave was released, and a polymer was recovered in a large amount of methanol and dried in vacuum at 110° C. for 12 hours.

The amount of the polymer (propylene-1-butene random copolymer) obtained was 45.2 g, and the polymerization activity was 90 kg-polymer/mmol-Zr·hr. This polymer had a 1-butene content of 20.2% by mol, an intrinsic viscosity (η) of 1.90 dl/g and a melting point of 101.5° C. The proportion of the hetero bonds based on the 2,1-insertions was about 0.02%.

Preparation Example 1
Preparation of PBR-1

To a 2-liter autoclave thoroughly purged with nitrogen were introduced 950 ml of hexane and 30 g of 1-butene, followed by adding 1 mmol of triisobutylaluminum. After the temperature of the system was elevated to 70° C., propylene was fed so that the total pressure became 7 kg/cm$^2$-G, and 0.30 mmol of methylaluminoxane and 0.001 mmol (in terms of Zr atom) of rac-dimethylsilylene-bis{1-(2-methyl-4-phenylindenyl)}zirconium dichloride prepared in a manner similar to the above synthesis example were further added. The polymerization was performed for 30 minutes while propylene was continuously fed to keep the total pressure at 7 kg/cm$^2$-G. After the polymerization, the autoclave was released, and a polymer was recovered in a large amount of methanol and dried in vacuum at 110° C. for 12 hours.

The amount of the polymer (propylene-1-butene random copolymer) obtained was 52.1 g, and the polymerization activity was 104 kg-polymer/mmol-Zr·hr. This polymer had a 1-butene content of 13.9% by mol, an intrinsic viscosity (η) of 2.51 dl/g and a melting point of 116.3° C. The proportion of the hetero bonds based on the 2,1-insertions was about 0.02%.

Comparative Preparation Example 4
Preparation of PBR-4

To a 2-liter autoclave thoroughly purged with nitrogen were introduced 830 ml of hexane and 100 g of 1-butene, followed by adding 1 mmol of triisobutylaluminum. After the temperature of the system was elevated to 70° C., propylene was fed so that the total pressure became 7 kg/cm$^2$-G, and 1 mmol of triethylaluminum and 0.005 mmol (in terms of Ti atom) of a titanium catalyst supported on magnesium chloride was added. The polymerization was performed for 30 minutes while propylene was continuously fed to keep the total pressure at 7 kg/cm$^2$-G. After the polymerization, the autoclave was released, and a polymer was recovered in a large amount of methanol and dried in vacuum at 110° C. for 12 hours.

The amount of the polymer (propylene-1-butene random copolymer) obtained was 33.7 g, and the polymerization activity was 14 kg-polymer/mmol-Zr·hr. This polymer had a 1-butene content of 25.3% by mol, an intrinsic viscosity (η) of 1.89 dl/g and a melting point of 110.0° C. The proportion of the hetero bonds based on the 2,1-insertions was lower than the limit of detection.

through heated rolls to stretch it in the longitudinal direction until the stretch ratio became 5 times. Thus, a monoaxially stretched sheet of polypropylene-1 (crystalline polypropylene) was formed.

On one surface of the monoaxially stretched sheet of crystalline polypropylene as a substrate, a layer of each polypropylene composition shown in Table 3 was laminated in the following manner.

The polypropylene composition shown in Table 3 was melt kneaded in a different extruder, and a film of the molten composition extruded through a different T-die at a resin temperature of 230° C., to laminate the film on the substrate. The resulting laminated sheet was continuously passed in a heated tenter to stretch it in the lateral direction until the stretch ratio became 10 times. Thus, a laminated film consisting of a biaxially stretched substrate (thickness: 22 μm) made of crystalline polypropylene and a monoaxially stretched layer (thickness: 3 μm) made of polypropylene composition was obtained.

The laminated film obtained was evaluated in the following manner, and the results are set forth in Table 3.

(1) Heat-sealing strength

The laminated film obtained in each example was used as a sample.

Two laminated films each formed from the polypropylene composition and the stretched homopolypropylene were superposed one upon another in such a manner that the polypropylene composition sides faced each other, and they were heat-sealed at various temperatures for 1 second under a pressure of 2 kg/cm$^2$ by means of a seal bar having a width of 5 mm and then allowed to stand for cooling.

Each of the resulting heat-sealed laminate was cut to give a specimen having a width of 15 mm, and the heat-sealed portion of the specimen was peeled at a cross head speed of 20 mm/min to measure the peel strength. A heat-sealing temperature at which a peel strength value of 300 g/15 mm was produced was taken as a lowest effective heat-sealable temperature.

(2) Haze

A film formed in accordance with ASTM D1003 was aged for one day at 50° C. in an air oven. The haze values before and after the aging were measured.

(3) Slip Properties

A film formed in accordance with ASTM D1894 was aged for one day at 50° C. in an air oven. The static and kinetic coefficients of friction before and after the aging were measured.

TABLE 2

| | | 1-Butene content (mol %) | Intrinsic viscosity (η) (dl/g) | DSC melting point (° C.) | Crystallinity (%) | Stereoregularity | Mw/Mn | B value |
|---|---|---|---|---|---|---|---|---|
| Prep. Ex. 1 | PBR-1 | 13.9 | 2.51 | 116.3 | 56 | 100 | 1.9 | 1.0 |
| Prep. Ex. 2 | PBR-2 | 20.2 | 1.90 | 101.5 | 50 | 100 | 2.0 | 1.0 |
| Prep. Ex. 3 | PBR-3 | 26.4 | 1.60 | 88.4 | 40 | 100 | 2.0 | 1.0 |
| Com. Prep. Ex. 4 | PBR-4 | 25.3 | 1.89 | 110.0 | 48 | 100 | 3.5 | 0.94 |

PBR . . . Propylene-1-butene random copolymer

Examples 1–6

The polypropylene-1 was melted in an extruder, then extruded through a T-die at a resin temperature of 250° C. and cooled to be hardened into a sheet. The sheet was passed (4) Blocking Resistance Evaluated in accordance with ASTM D1893. A film sample for measuring the heat-sealing strength (1) was cut to give a specimen having a width of 10 cm and a length of 15 cm. Two of the specimens were superposed in such a manner that the polypropylene composition sides faced each other, and they were interposed between two glass plates. The specimens with the glass plates were allowed to stand in an air oven at 50° C. with applying a load of 10 kg. After one day, the specimens were taken out, and the peel strength was measured by a universal testing machine. The peel strength per 1 cm was taken as a value of the blocking resistance.

Comparative Examples 1–2

A laminated film was obtained in the same manner as in Example 1 except that the polypropylene composition shown in Table 3 was used. The results are set forth in Table 3.

TABLE 3

|  | Composition (weight ratio) | Lowest effective heat-sealable temp. (° C.) | Haze (%) | Slip properties* | Blocking resistance (g/cm) |
| --- | --- | --- | --- | --- | --- |
| Ex. 1 | PBR-1/PP-2 (75/25) | 110 | 0.8 | 0.28/0.28 | 0.1 |
| Ex. 2 | PBR-2/PP-2 (75/25) | 100 | 0.6 | 0.32/0.31 | 0.2 |
| Ex. 3 | PBR-3/PP-2 (75/25) | 88 | 1.4 | 0.99/0.51 | 0.9 |
| Comp. Ex. 1 | PBR-4/PP-2 (75/25) | 100 | 1.7 | 3.23/1.02 | 2.6 |
| Ex. 4 | PBR-1/PP-2 (50/50) | 118 | 0.6 | 0.29/0.29 | 0.1 |
| Ex. 5 | PBR-2/PP-2 (50/50) | 108 | 0.5 | 0.34/0.30 | 0.2 |
| Ex. 6 | PBR-3/PP-2 (50/50) | 95 | 0.8 | 0.27/0.27 | 0.4 |
| Comp. Ex. 2 | PBR-4/PP-2 (50/50) | 105 | 2.5 | 0.37/0.32 | 0.8 |

PBR . . . Propylene-1-butene random copolymer
PP . . . Polypropylene
* . . . Static friction coefficient/kinetic friction coefficient The properties of the propylene composite films obtained in the following examples were measured in the manner described below.

(1) Haze Measured in accordance with ASTM D1003.

(2) Change of Haze With Time

The composite film was kept at 80° C. for 3 days and allowed to stand for cooling. Then, the haze was measured in the same manner as in the measurement (1).

(3) Glossiness Measured in accordance with ASTM D523.

(4) Tear Strength (Elmendorf tear strength) Measured in accordance with ASTM D1922.

(5) Slip properties Measured in accordance with ASTM D1894.

(6) Change of Slip Properties With Time

The composite film was kept at 40° C. for one week and allowed to stand for cooling. Then, the slip properties were measured in the same manner as in the measurement (5).

(7) Blocking Resistance Measured in accordance with ASTM D1893.

(8) Change of Blocking Resistance With Time

The composite film was kept at 50° C. for one week and allowed to stand for cooling. Then, the blocking tendency was measured in the same manner as in the measurement (7).

(9) Heat-Sealing Strength

Two of the composite films were superposed one upon another in such a manner that the polypropylene composition layers (II) faced each other, and they were heat-sealed at various temperatures shown in Table 4 for 1 second under a pressure of 2 kg/cm$^2$ by means of a seal bar having a width of 5 mm and then allowed to stand for cooling.

The sample thus heat-sealed at each temperature was cut to give a specimen having a width of 15 mm. The heat-sealed portion of the specimen was peeled at a cross head speed of 300 mm/min to measure the peel strength.

(10) Hot Tack Properties

Two composite films were superposed one upon another in such a manner that the polypropylene composition layers (II) faced each other, and they were heat-sealed at various temperatures shown in Table 4 for 1 second under a pressure of 2 kg/cm$^2$. Then, a peeled distance in the heat-sealed portion was measured under a load of 45 g.

Preparation Example 5

Preparation of PBR-5

To a 2-liter autoclave thoroughly purged with nitrogen were introduced 900 ml of hexane and 60 g of 1-butene, followed by adding 1 mmol of triisobutylaluminum. After the temperature of the system was elevated to 70° C., propylene was fed so that the total pressure became 7 kg/cm$^2$-G, and 0.30 mmol of methylaluminoxane and 0.001 mmol (in terms of Zr atom) of the rac-dimethylsilylene-bis{1-(2-methyl-4-phenylindenyl)}zirconium dichloride were further added. The polymerization was performed for 30 minutes while propylere was continuously fed to keep the total pressure at 7 kg/cm$^2$-G. After the polymerization, the autoclave was released, and a polymer was recovered in a large amount of methanol, and dried in vacuum at 110° C. for 12 hours.

The amount of the polymer obtained was 39.7 g, and the polymerization activity was 79 kg-polymer/mmol-Zr·hr. This polymer (propylene-1-butene random copolymer) had a 1-butene content of 24% by mol, an intrinsic viscosity ($\eta$) of 1.63 dl/g and a melting point of 92° C. The properties of this polymer are set forth in Table 4.

Preparation Examples 6–7

Propylene-1-butene random copolymers shown in Tables 4 and 5 were obtained in the same manner as in Preparation Example 5 except that the amounts of hexane, 1-butene and propylene were varied.

Comparative Preparation Example 8

To a 2-liter autoclave thoroughly purged with nitrogen were introduced 830 ml of hexane and 100 g of 1-butene, followed by adding 1 mmol of triisobutylaluminum. After the temperature of the system was elevated to 70° C., propylene was fed so that the total pressure became 7 kg/cm$^2$-G, and 1 mmol of triethylaluminum and 0.005 mmol (in terms of Ti atom) of a titanium catalyst supported on magnesium chloride were further added. The polymerization was performed for 30 minutes while propylene was continuously fed to keep the total pressure at 7 kg/cm$^2$-G. After the polymerization, the autoclave was released, and a polymer was recovered in a large amount of methanol and dried in vacuum at 110° C. for 12 hours.

The amount of the polymer obtained was 33.7 g, and the polymerization activity was 14 kg-polymer/mmol-Zr·hr.

This polymer had a 1-butene content of 23% by mol, an intrinsic viscosity ($\eta$) of 1.91 dl/g and a melting point of 110° C. The properties of this polymer are set forth in Tables 4 and 5.

Examples 7–9

A homopolypropylene (I) having an isotactic index (I.I.) of 96% and a melt index of 1.5 was molded into a sheet at 240° C. and stretched at 140° C. in a stretch ratio of 5 times in the longitudinal direction.

The sheet thus obtained was used as a substrate. On one surface of the substrate, a layer of the following polypropylene composition (II) was laminated.

100 Parts by weight of a mixture consisting of 25% by weight of pellets of a random polypropylene having an isotactic index (I.I.) of 96%, a melt index (230° C.) of 6.5 and a melting point of 140° C. and 75% by weight of pellets of the propylene-1-butene random copolymer (B) (PBR) prepared above was mixed with 0.1 part by weight of an anti-blocking agent and 0.16 part by weight of a slip agent. The resulting mixture, i.e., the polypropylene composition (II), was melted in an extruder and then extruded on the substrate at 200° C. to form a laminated sheet.

The laminated sheet was stretched at 170° C. in a stretch ratio of 10 times in the lateral direction and then cooled with substantially maintaining the stretched state.

Thus, a biaxially stretched composite film consisting of a layer of the homopolypropylene (I) (substrate) having a thickness of 22 µm and a layer of the polypropylene composition (II) (heat-sealing layer) having a thickness of 3 µm was obtained. The results are set forth in Table 4.

Comparative Example 3

A composite film was obtained in the same manner as in Example 7 except that in the preparation of a polypropylene composition, the propylene-1-butene random copolymer obtained in Comparative Preparation Example 8 was used in place of the propylene-1-butene random copolymer (B) obtained in Preparation Example 5. The results are set forth in Table 4.

Examples 10–12

A homopolypropylene (I) having an isotactic index (I.I.) of 96% and a melt index of 6.5 was melted and fed to a composite film-forming die at a resin temperature of 240° C.

Separately, in a different extruder, 100 parts by weight of a mixture consisting of 25% by weight of pellets of a random polypropylene having a melt index (230° C.) of 6.5 and a melting point of 140° C. and 75% by weight of pellets of the propylene-1-butene random copolymer (B) (PBR) prepared above was mixed with 0.1 part by weight of an anti-blocking agent and 0.16 part by weight of a slip agent, and they were melted in the extruder. The resulting polypropylene composition (II) was fed to the above-mentioned composite film-forming die at a resin temperature of 200° C.

The homopolypropylene (I) and the polypropylene composition (II) were simultaneously extruded through the composite film-forming die, to obtain a composite film consisting of a layer of the homopolypropylene (I) (substrate) having a thickness of 45 µm and a layer of the polypropylene composition (II) (heat-sealing layer) having a thickness of 5 µm. The results are set forth in Table 4.

Comparative Example 4

A composite film was obtained in the same manner as in Example 10 except that the propylene-1-butene random copolymer obtained in Comparative Preparation Example 8 was used in place of the propylene-1-butene random copolymer (B) obtained in Preparation Example 5. The results are set forth in Table 4.

TABLE 4-I

| (B) PBR | Ex. 7 PBR-5 (Prep. Ex. 5) | Comp. Ex. 3 PBR-8 (Comp. Prep. Ex. 8) | Ex. 8 PBR-6 (Prep. Ex. 6) | Ex. 9 PBR-7 (Prep. Ex. 7) |
|---|---|---|---|---|
| (1) Propylene content (mol %) | 76 | 77 | 81 | 85 |
| 1-Butene content (mol %) | 24 | 23 | 19 | 15 |
| (2) Intrinsic viscosity (η) (dl/g) | 1.63 | 1.91 | 1.65 | 1.67 |
| (3) Mw/Mn | 2.05 | 3.40 | 2.10 | 2.18 |
| (4) B value | 1.00 | 0.92 | 1.02 | 1.03 |
| (5) Tm (° C.) | 92 | 110 | 103 | 110 |
| (6) Crystallinity (%) | 40 | 48 | 49 | 53 |
| Composition | | | | |
| (A) Polypropylene (wt %) | 25 | 25 | 25 | 25 |
| (B) PBR (wt %) | 75 | 75 | 75 | 75 |
| Thickness | | | | |
| (I) Substrate (µm) | 22 | 22 | 22 | 22 |
| (II) Heat-sealing layer (µm) | 3 | 3 | 3 | 3 |
| (1) Haze (%) | 1.4 | 1.7 | 0.6 | 0.8 |
| (2) Change of haze with time (%) | 1.1 | 2.9 | 1.0 | 1.0 |
| (3) Glossiness (%) | 115 | 112 | 128 | 126 |
| (4) Slip properties | | | | |
| /static friction | 1.0 | 3.2 | 0.3 | 0.3 |
| /kinetic friction | 0.5 | 1.0 | 0.3 | 0.3 |
| (5) Slip properties | | | | |

TABLE 4-I-continued

| (B) PBR | Ex. 7 PBR-5 (Prep. Ex. 5) | Comp. Ex. 3 PBR-8 (Comp. Prep. Ex. 8) | Ex. 8 PBR-6 (Prep. Ex. 6) | Ex. 9 PBR-7 (Prep. Ex. 7) |
|---|---|---|---|---|
| with time | | | | |
| /static friction | 0.6 | 1.6 | 0.3 | 0.3 |
| /kinetic friction | 0.4 | 0.7 | 0.3 | 0.3 |
| (6) Blocking resistance (g/cm) | 1.9 | 2.6 | 0.2 | 0.1 |
| (7) Blocking resistance with time (g/cm) | 3.0 | 7.0 | 0.0 | 0.0 |
| (8) Heat-sealing strength (g/15 mm) | | | | |
| 85° C. | 40 | 20 | | |
| 90° C. | 480 | 50 | | |
| 95° C. | 630 | 130 | 90 | |
| 100° C. | 550 | 480 | 300 | |
| 105° C. | 730 | 570 | 540 | 20 |
| 110° C. | 520 | 570 | 440 | 320 |
| 115° C. | 520 | 520 | 440 | 540 |
| 120° C. | | | 470 | 500 |
| (9) Hot tack properties (mm) | | | | |
| 95° C. | 300 | 300 | | |
| 100° C. | 32 | 230 | | |
| 105° C. | 15 | 120 | 300 | |
| 110° C. | 8 | 63 | 120 | 300 |
| 115° C. | 7 | 27 | 25 | 120 |
| 120° C. | 6 | 13 | 10 | 42 |
| 125° C. | 7 | 18 | 8 | 12 |
| 130° C. | 8 | 16 | 6 | 5 |
| 135° C. | 7 | 15 | 6 | 6 |
| 140° C. | 7 | 18 | 7 | 5 |

TABLE 4-II

| (B) PBR | Ex. 10 PBR-5 (Prep. Ex. 5) | Comp. Ex. 4 PBR-8 (Comp. Prep. Ex. 8) | Ex. 11 PBR-6 (Prep. Ex. 6) | Ex. 12 PBR-7 (Prep. Ex. 7) |
|---|---|---|---|---|
| (1) Propylene content (mol %) | 76 | 77 | 81 | 85 |
| 1-Butene content (mol %) | 24 | 23 | 19 | 15 |
| (2) Intrinsic viscosity (η) (dl/g) | 1.63 | 1.91 | 1.65 | 1.67 |
| (3) Mw/Mn | 2.05 | 3.40 | 2.10 | 2.18 |
| (4) B value | 1.00 | 0.92 | 1.02 | 1.03 |
| (5) Tm (° C.) | 92 | 110 | 103 | 110 |
| (6) Crystallinity (%) | 40 | 48 | 49 | 53 |
| Composition | | | | |
| (A) Polypropylene (wt %) | 25 | 25 | 25 | 25 |
| (B) PBR (wt %) | 75 | 75 | 75 | 75 |
| Thickness | | | | |
| (I) Substrate (μm) | 45 | 45 | 45 | 45 |
| (II) Heat-sealing layer (μm) | 5 | 5 | 5 | 5 |
| (1) Haze (%) | 1.8 | 2.1 | 4.2 | 2.1 |
| (2) Change of haze with time (%) | 2.0 | 10.2 | 4.0 | 2.1 |
| (3) Glossiness (%) | 118 | 114 | 98 | 114 |
| (4) Slip properties | | | | |
| /static friction | 0.2 | not slipped | 0.2 | 0.2 |
| /kinetic friction | 0.2 | not slipped | 0.2 | 0.1 |

TABLE 4-II-continued

| (B) PBR | Ex. 10<br>PBR-5<br>(Prep. Ex. 5) | Comp. Ex. 4<br>PBR-8<br>(Comp. Prep. Ex. 8) | Ex. 11<br>PBR-6<br>(Prep. Ex. 6) | Ex. 12<br>PBR-7<br>(Prep. Ex. 7) |
|---|---|---|---|---|
| (5) Slip properties with time | | | | |
| /static friction | | | | |
| /kinetic friction | | | | |
| (6) Blocking resistance (g/cm) | 1.7 | 2.4 | 0.3 | 0.4 |
| (7) Blocking resistance with time (g/cm) | 1.0 | 4.6 | 0.0 | 0.5 |
| (8) Heat-sealing strength (g/15 mm) | | | | |
| 80° C. | 30 | | | |
| 90° C. | 130 | | 50 | |
| 100° C. | 800 | 140 | 590 | |
| 110° C. | 1650 | 1270 | 1570 | 20 |
| 120° C. | 1720 | 1790 | 440 | 320 |
| 130° C. | 1730 | 2080 | 440 | 540 |
| 140° C. | 2070 | 2300 | 470 | 500 |
| 150° C. | | 1940 | 440 | 320 |
| 160° C. | | 2200 | 440 | 540 |
| 170° C. | | 2100 | 470 | 500 |
| (9) Hot tack properties (mm) | | | | |
| 100° C. | 300 | | | |
| 110° C. | 130 | 300 | 300 | 300 |
| 120° C. | 25 | 220 | 140 | 220 |
| 130° C. | 20 | 120 | 30 | 30 |
| 140° C. | 20 | 50 | 20 | 20 |
| 150° C. | 50 | 40 | 20 | 20 |
| 160° C. | 60 | 55 | 40 | 40 |
| 170° C. | | 50 | 60 | 50 |

Examples 13–14

A homopolypropylene (I) having an isotactic index (I.I.) of 96% and a melt index of 1.5 was molded into a sheet at 240° C. and stretched at 140° C. in a stretch ratio of 5 times in the longitudinal direction.

The sheet thus obtained was used as a substrate. On one surface of the substrate, a layer of the following polypropylene composition (II) was laminated.

100 Parts by weight of a mixture consisting of 75% by weight of pellets of a random polypropylene having an isotactic index (I.I.) of 96%, a melt index (230° C.) of 6.5 and a melting point of 140° C. and 25% by weight of pellets of the propylene-1-butene random copolymer (B) (PBR) prepared above was mixed with 0.1 part by weight of an anti-blocking agent and 0.16 part by weight of a slip agent. The resulting mixture, i.e., the polypropylene composition (II), was melted in an extruder and then extruded on the substrate at 200° C. to form a laminated sheet.

Then, the laminated sheet was stretched at 170° C. in a stretch ratio of 10 times in the lateral direction and then cooled while substantially maintaining the stretched state.

Thus, a biaxially stretched composite film consisting of a layer of the homopolypropylene (I) (substrate) having a thickness of 22 μm and a layer of the polypropylene composition (II) (heat-sealing layer) having a thickness of 3 μm was obtained. The results are set forth in Table 5.

Comparative Example 5

A composite film was obtained in the same manner as in Example 13 except that in the preparation of a polypropylene composition, the propylene-1-butene random copolymer obtained in Comparative Preparation Example 8 was used in place of the propylene-1-butene random copolymer (B) obtained in Preparation Example 5. The results are set forth in Table 5.

Examples 15–17

A homopolypropylene (I) having an isotactic index (I.I.) of 96% and a melt index of 6.5 was melted and fed to a composite film-forming die at a resin temperature of 240° C.

Separately, in a different extruder, 100 parts by weight of a mixture consisting of 75% by weight of pellets of a random polypropylene having a melt index (230° C.) of 6.5 and a melting point of 140° C. and 25% by weight of pellets of the propylene-1-butene random copolymer (B) (PBR) prepared above was mixed with 0.1 part by weight of an anti-blocking agent and 0.16 part by weight of a slip agent, and they were melted in the extruder. The resulting polypropylene composition (II) was fed to the above-mentioned composite film-forming die at a resin temperature of 200° C.

The homopolypropylene (I) and the polypropylene composition (II) were simultaneously extruded through the composite film-forming die, to obtain a composite film consisting of a layer of the homopolypropylene (I) (substrate) having a thickness of 45 μm and a layer of the polypropylene composition (II) (heat-sealing layer) having a thickness of 5 μm. The results are set forth in Table 5.

Comparative Example 6

A composite film was obtained in the same manner as in Example 15 except that the propylene-1-butene random copolymer obtained in Comparative Preparation Example 8 was used in place of the propylene-1-butene random copolymer (B) obtained in Preparation Example 5. The results are set forth in Table 5.

TABLE 5-I

| (B) PBR | Ex. 13<br>PBR-5<br>(Prep. Ex. 5) | Comp. Ex. 5<br>PBR-8<br>(Comp. Prep. Ex. 8) | Ex. 14<br>PBR-6<br>(Prep. Ex. 6) |
|---|---|---|---|
| (1) Propylene content (mol %) | 76 | 77 | 81 |
| 1-Butene content (mol %) | 24 | 23 | 19 |
| (2) Intrinsic viscosity (η) (dl/g) | 1.63 | 1.91 | 1.65 |
| (3) Mw/Mn | 2.05 | 3.40 | 2.10 |
| (4) B value | 1.00 | 0.92 | 1.02 |
| (5) Tm (° C.) | 92 | 110 | 103 |
| (6) Crystallinity (%) | 40 | 48 | 49 |
| Composition | | | |
| (A) Polypropylene (wt %) | 75 | 75 | 75 |
| (B) PBR (wt %) | 25 | 25 | 25 |
| Thickness | | | |
| (I) Substrate (μm) | 22 | 22 | 22 |
| (II) Heat-sealing layer (μm) | 3 | 3 | 3 |

TABLE 5-I-continued

| (B) PBR | Ex. 13<br>PBR-5<br>(Prep. Ex. 5) | Comp. Ex. 5<br>PBR-8<br>(Comp. Prep. Ex. 8) | Ex. 14<br>PBR-6<br>(Prep. Ex. 6) |
|---|---|---|---|
| (1) Haze (%) | 1.7 | 1.5 | 1.9 |
| (2) Change of haze with time (%) | 1.4 | 1.2 | 1.6 |
| (3) Glossiness (%) | 122 | 123 | 122 |
| (4) Slip properties | | | |
| /static friction | 0.3 | 0.4 | 0.3 |
| /kinetic friction | 0.3 | 0.4 | 0.3 |
| (5) Blocking tendency (g/cm) | 0.1 | 0.3 | 0.1 |
| (6) Blocking tendency with time (g/cm) | 0.3 | 0.6 | 0.3 |
| (7) Heat-sealing strength (g/15 mm) | | | |
| 100° C. | 40 | | |
| 105° C. | 100 | 50 | |
| 110° C. | 400 | 140 | |
| 115° C. | 510 | 350 | 30 |
| 120° C. | 540 | 460 | 180 |
| 125° C. | 500 | 460 | 510 |
| 130° C. | 460 | 460 | 480 |
| 135° C. | | 470 | 480 |
| 140° C. | | 480 | 480 |
| 150° C. | | | 470 |

TABLE 5-II

| (B) PBR | Ex. 15<br>PBR-5<br>(Prep. Ex. 5) | Comp. Ex. 6<br>PBR-8<br>(Comp. Prep. Ex. 8) | Ex. 16<br>PBR-6<br>(Prep. Ex. 6) | Ex. 17<br>PBR-7<br>(Prep. Ex. 7) |
|---|---|---|---|---|
| (1) Propylene content (mol %) | 76 | 77 | 81 | 85 |
| 1-Butene content (mol %) | 24 | 23 | 19 | 15 |
| (2) Intrinsic viscosity (η) (dl/g) | 1.63 | 1.91 | 1.65 | 1.67 |
| (3) Mw/Mn | 2.05 | 3.40 | 2.10 | 2.18 |
| (4) B value | 1.00 | 0.92 | 1.02 | 1.03 |
| (5) Tm (° C.) | 92 | 110 | 103 | 110 |
| (6) Crystallinity (%) | 40 | 48 | 49 | 53 |
| Composition | | | | |
| (A) Polypropylene (wt %) | 75 | 75 | 75 | 75 |
| (B) PBR (wt %) | 25 | 25 | 25 | 25 |
| Thickness | | | | |
| (I) Substrate (μm) | 45 | 45 | 45 | 45 |
| (II) Heat-sealing layer (μm) | 5 | 5 | 5 | 5 |
| (1) Haze (%) | 2.4 | 2.5 | 2.0 | 2.1 |
| (2) Change of haze with time (%) | 2.0 | 2.8 | 2.0 | 2.4 |
| (3) Glossiness (%) | 111 | 115 | 117 | 115 |
| (4) Slip properties | | | | |
| /static friction | 0.2 | 0.3 | 0.3 | 0.2 |
| /kinetic friction | 0.2 | 0.2 | 0.2 | 0.2 |
| (5) Slip properties with time | | | | |
| /static friction | 0.2 | 0.3 | 0.2 | 0.3 |
| /kinetic friction | 1.0 | 1.5 | 0.3 | 0.3 |

TABLE 5-II-continued

| (B) PBR | Ex. 15<br>PBR-5<br>(Prep. Ex. 5) | Comp. Ex. 6<br>PBR-8<br>(Comp. Prep. Ex. 8) | Ex. 16<br>PBR-6<br>(Prep. Ex. 6) | Ex. 17<br>PBR-7<br>(Prep. Ex. 7) |
|---|---|---|---|---|
| (6) Blocking resistance (g/cm) | 0.2 | 0.3 | 0.2 | 0.3 |
| (7) Blocking resistance with time (g/cm) | 1.0 | 1.5 | 0.3 | 0.3 |
| (8) Heat-sealing strength (g/15 mm) | | | | |
| 100° C. | 10 | 10 | 20 | 20 |
| 110° C. | 160 | 80 | 100 | 80 |
| 120° C. | 1900 | 1360 | 1130 | 900 |
| 130° C. | 2130 | 2380 | 2130 | 2100 |
| 140° C. | 2090 | 2370 | 2090 | 1900 |
| 150° C. | 2400 | 2520 | 2400 | 1890 |
| 160° C. | | 2360 | | 1960 |

What is claimed is:

1. A polypropylene composition comprising:
   (A) polypropylene in an amount of 5 to 95% by weight, and
   (B) a propylene-1-butene random copolymer in an amount of 95 to 5% by weight,
   based on the weight of the polypropylene and propylene-1-butene random copolymer;
   said propylene-1-butene random copolymer (B) having the following properties:
   (1) the copolymer contains 70 to 87% by mol of constituent units from propylene and 30 to 13% by mol of constituent units from 1-butene, based on the amount of propylene and 1-butene units in the copolymer;
   (2) the intrinsic viscosity, as measured in decahydronaphthalene at 135° C., is in the range of 0.1 to 12 dl/g;
   (3) the molecular weight distribution (Mw/Mn), as determined by gel permeation chromatography (GPC), is not more than 3; and
   (4) the parameter B value indicating randomness of the copolymerized monomer sequence distribution is in the range of 1.0 to 1.5.

2. The polypropylene composition as claimed in claim 1, wherein the polypropylene (A) is a random copolymer of propylene and an olefin other than propylene, which contains not more than 10% by mol of units from the olefin.

3. The polypropylene composition as claimed in claim 1, wherein the propylene-1-butene random copolymer (B) further has, in addition to the properties (1) to (4), the following properties (5) and (6):
   (5) the melting point Tm, as measured by a differential scanning calorimeter, is in the range of 60 to 140° C., and the melting point Tm and the 1-butene constituent unit content M (% by mol) satisfy the following relation:

$-2.6M+130 \leq Tm \leq -2.3M+155$; and (6) the crystallinity C, as measured by X-ray diffractometry, and the 1-butene constituent unit content M (% by mol) satisfy the following relation:

$C \geq -1.5M+75$.

4. The polypropylene composition as claimed in claim 3, wherein the parameter B value of the propylene-1-butene random copolymer (B) is in the range of 1.0 to 1.3.

5. The polypropylene composition as claimed in claim 1, wherein the propylene-1-butene random copolymer (B) is prepared using an olefin polymerization catalyst comprising:
   (a) a transition metal compound represented by the following formula (1):

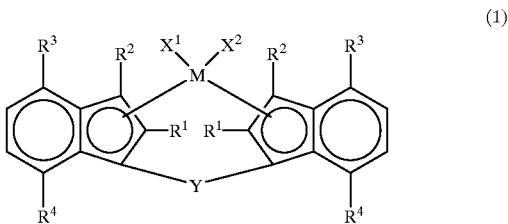

(1)

wherein M is a transition metal of Group IVa, Va or VIa of the periodic table,
$R^1$ and $R^2$ are each a hydrogen atom, a halogen atom, a hydrocarbon group of 1 to 20 carbon atoms, a halogenated hydrocarbon group of 1 to 20 carbon atoms, a silicon-containing group, an oxygen-containing group, a sulfur-containing group, a nitrogen-containing group or a phosphorus-containing group,
$R^3$ is a hydrocarbon group of 1 to 20 carbon atoms which may be substituted with a halogen atom or a silicon-containing group,
$R^4$ is a hydrogen atom or an alkyl group of 1 to 20 carbon atoms,
$X^1$ and $X^2$ are each a hydrogen atom, a halogen atom, a hydrocarbon group of 1 to 20 carbon atoms, a halogenated hydrocarbon group of 1 to 20 carbon atoms, an oxygen-containing group or a sulfur-containing group, and
Y is a divalent hydrocarbon group of 1 to 20 carbon atoms, a divalent halogenated hydrocarbon group of 1 to 20 carbon atoms, a divalent silicon-containing group, a divalent germanium-containing group, a divalent tin-containing group, —O—, —CO—, —S—, —SO—, —$SO_2$—, —$NR^5$—, —$P(R^5)$—, —P(O) ($R^5$)—, —$BR^5$— or —$AlR^5$— ($R^5$ is a hydrogen atom, a halogen atom, a hydrocarbon group of 1 to 20 carbon atoms or a halogenated hydrocarbon group of 1 to 20 carbon atoms);

(b) (b-1) an organoaluminum oxy-compound, and/or
    (b-2) a compound capable of reacting with the transition metal compound (a) to form an ion pair;
and, optionally,
(c) an organoaluminum compound.

6. The polypropylene composition as claimed in claim 5, wherein $R^1$ in the formula (I) representing the transition metal compound (a) is methyl.

7. The polypropylene composition as claimed in claim 5, wherein $R^1$ in the formula (I) representing the transition metal compound (a) is a hydrocarbon group of 2 to 6 carbon atoms.

8. A polypropylene composite film comprising:
(I) a crystalline polypropylene layer, and
(II) a layer formed from the polypropylene composition as claimed in claim 1, which is laminated on at least one surface of the crystalline polypropylene layer (I).

9. The polypropylene composite film as claimed in claim 8, wherein the polypropylene composition layer (II) contains:
the polypropylene (A) in an amount of 5 to 50% by weight, and
the propylene-1-butene random copolymer (B) in an amount of 95 to 50% by weight.

10. The polypropylene composite film as claimed in claim 8, wherein the polypropylene composition layer (II) contains:
the polypropylene (A) in an amount of not less than 50% by weight and less than 90% by weight, and
the propylene-1-butene random copolymer (B) in an amount of not less than 10% by weight and less than 50% by weight.

11. The polypropylene composite film as claimed in claim 9, wherein the polypropylene (A) is a crystalline polypropylene containing units from propylene in an amount of not less than 90% by mol.

12. The polypropylene composite film as claimed in claim 8, wherein the intrinsic viscosity (2) of the propylene-1-butene random copolymer (B) is in the range of 0.1 to 5 dl/g.

13. The polypropylene composite film as claimed in claim 8, wherein the crystalline polypropylene layer (I) is unstretched.

14. The polypropylene composite film as claimed in claim 8, wherein the crystalline polypropylene layer (I) is biaxially stretched.

15. The polypropylene composite film as claimed in claim 10, wherein the polypropylene (A) is a crystalline polypropylene containing units from propylene in an amount of not less than 90% by mol.

16. The polypropylene composite film as claimed in claim 10, wherein the intrinsic viscosity (2) of the propylene-1-butene random copolymer(B) is in a range of 0.1 to 5 dl/g.

17. A polypropylene composition comprising:
(A) polypropylene in an amount of 20 to 90% by weight, and
(B) a propylene-1-butene random copolymer in an amount of 80 to 10% by weight, based on the weight of the polypropylene and propylene-1-butene random copolymer;
said propylene-1-butene random copolymer (B) having the following properties:
(1) the copolymer contains 70 to 87% by mol of constituent units from propylene and 30 to 13% by mol of constituent units from 1-butene, based on the amount of the propylene and 1-butene units in the copolymer;
(2) the intrinsic viscosity, as measured in decahydronaphthalene at 135° C., is in the range of 1 to 12 dl/g;
(3) the molecular weight distribution (Mw/Mn), as determined by gel permeation chromatography (GPC), is 1.8 to 2.5; and
(4) the parameter B value indicating randomness of the copolymerized monomer sequence distribution is in the range of 1.0 to 1.3.

18. The polypropylene composition as claimed in claim 17, wherein the polypropylene (A) is a random copolymer of propylene and $C_2$ to $C_{20}$ olefins other than propylene, which contains not more than 5% by mol of units from the olefin.

19. The polypropylene composition as claimed in claim 17, wherein the propylene-1-butene random copolymer (B) further has, in addition to the properties (1) to (4), the following properties (5) and (6):
(5) the melting point Tm, as measured by a differential scanning calorimeter, is in the range of 80 to 130° C., and the melting point Tm and the 1-butene constituent unit content M (% by mol) satisfy the following relation:

$-2.6M+130 \leq Tm \leq -2.3M+155$; and (6) the crystallinity C, as measured by X-ray diffractometry, and the 1-butene constituent unit content M (% by mol) satisfy the following relation:

$C \geq -1.5M+75$.

20. The polypropylene composition as claimed in claim 17, wherein the propylene-1-butene random copolymer (B) is prepared using an olefin polymerization catalyst comprising:
(a) a transition metal compound represented by the following formula (1):

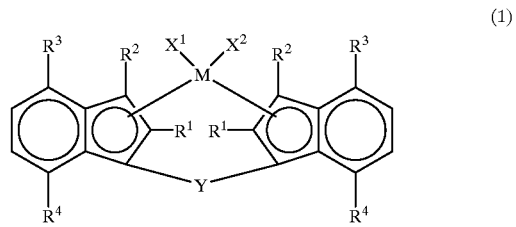

wherein M is zirconium,
$R^1$ and $R^2$ are each a hydrogen atom, a halogen atom, and a hydrocarbon group of 1 to 6 carbon atoms,
$R^3$ is a hydrocarbon group of 1 to 6 carbon atoms,
$R^4$ is a hydrogen atom or an alkyl group of 1 to 6 carbon atoms,
$X^1$ and $X^2$ are each a hydrogen atom or a halogen atom,
Y is a divalent hydrocarbon group of 1 to 6 carbon atoms, a divalent silicon-containing group;
(b) (b-1) an aluminoxane, and/or
    (b-2) a compound capable of reacting with the transition metal compound (a) to form an ion pair;
and, optionally
(c) an organoaluminum compound.

21. A polypropylene composite film comprising:
(I) a crystalline polypropylene layer, and
(II) a layer formed from the polypropylene composition as claimed in claim 17, which is laminated on at least one surface of the crystalline polypropylene layer (I), wherein the polypropylene composition layer (II) contains:
the polypropylene (A) in an amount of not less than 50% by weight and less than 90% by weight, and
the propylene-1-butene random copolymer (B) in an amount of not less than 10% by weight and less than 50% by weight,
based on the weight of the polypropylene and polypropylene-1-butene random copolymer, and
the intrinsic viscosity (2) of the propylene-1-butene random copolymer (B) is in the range of 0.1 to 5 dl/g and the melting point Tm is 60 to 140° C.

22. A polypropylene composition having a melting point of 80 to 160° C. and comprising:
(A) polypropylene in an amount of 25 to 85% by weight, and
(B) a propylene-1-butene random copolymer in an amount of 75 to 15% by weight,
based on the weight of the polypropylene and the propylene-1-butene random copolymer, and;
said propylene-1-butene random copolymer (B) having the following properties:
(1) the copolymer contains 70 to 86.1% by mol of constituent units from propylene and 30 to 13.9% by mol of constituent units from 1-butene, based on the amount of propylene and 1-butene units in the copolymer;
(2) the intrinsic viscosity, as measured in decahydronaphthalene at 135° C., is in the range of 1 to 12 dl/g;
(3) the molecular weight distribution (Mw/Mn), as determined by gel permeation chromatography (GPC), is 1.8 to 2.5;
(4) the parameter B value indicating randomness of the copolymerized monomer sequence distribution is in the range of 1.0 to 1.2;
(5) the melting point Tm, as measured by a differential scanning calorimeter, is in the range of 80 to 130° C.; and
(6) the crystallinity C, as measured by X-ray diffractometry, is in the range of 20 to 60%.

23. A polypropylene composition consisting essentially of:
(A) polypropylene in an amount of 25 to 75% by weight, and
(B) a propylene-1-butene random copolymer in an amount of 75 to 25% by weight,
based on the weight of the polypropylene and propylene-1-butene random copolymer;
said propylene-1-butene random copolymer (B) having the following properties:
(1) the copolymer contains 70 to 87% by mol of constituent units from propylene and 30 to 13% by mol of constituent units from 1-butene, based on the amount of the propylene and 1-butene units in the copolymer;
(2) the intrinsic viscosity, as measured in decahydronaphthalene at 135° C., is in the range of 0.1 to 5 dl/g;
(3) the molecular weight distribution (Mw/Mn), as determined by gel permeation chromatography (GPC), is 1.8 to 2.5; and
(4) the parameter B value indicating randomness of the copolymerized monomer sequence distribution is in the range of 1.0 to 1.3.

* * * * *